Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 1

INVENTOR.
WILLIAM H. WANNAMAKER JR

BY [signature]
ATTORNEY.

Nov. 21, 1950 W. H. WANNAMAKER, JR 2,531,313
OSCILLATOR AND OSCILLATOR-CONTROLLED RELAY SYSTEM
Filed June 22, 1944 12 Sheets-Sheet 2
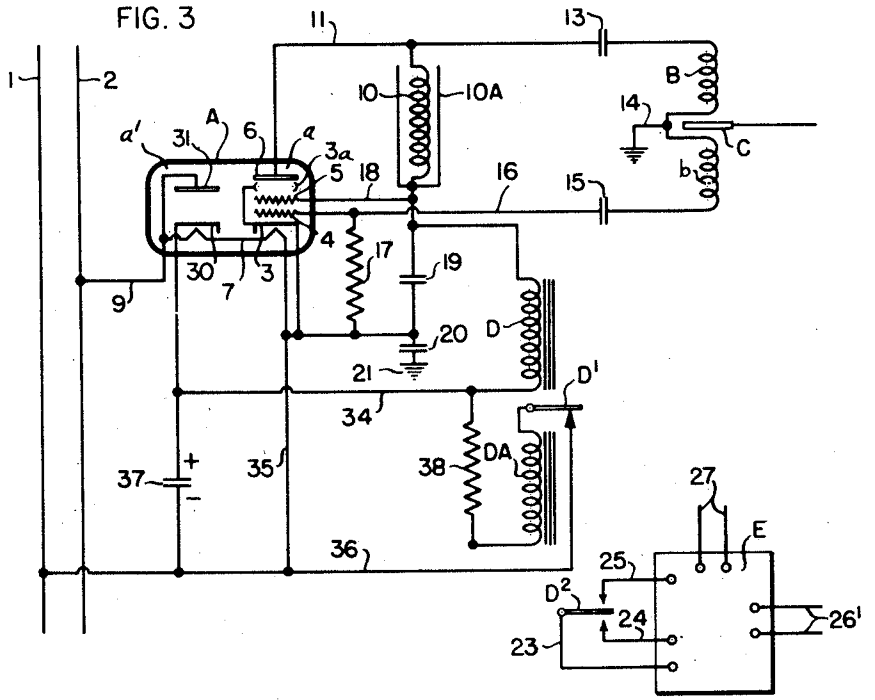
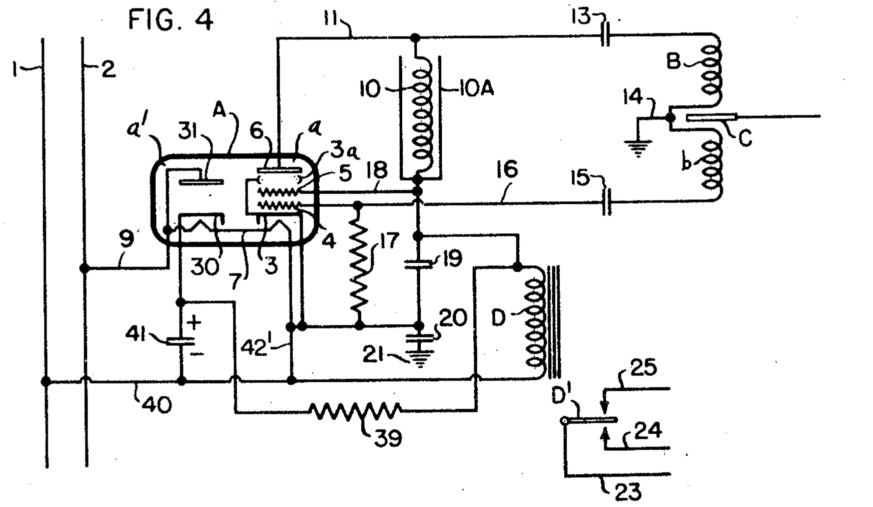
INVENTOR.
WILLIAM H. WANNAMAKER JR
BY C. B. Spangenberg
ATTORNEY.

Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 3

INVENTOR.
WILLIAM H. WANNAMAKER JR

BY

*C.B. Spangenberg*

ATTORNEY.

Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 4

INVENTOR
WILLIAM H. WANNAMAKER JR.

BY

ATTORNEY.

Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 5

INVENTOR.
WILLIAM H. WANNAMAKER JR.

BY

C B Spangenberg

ATTORNEY.

OSCILLATOR AND OSCILLATOR-CONTROLLED RELAY SYSTEM

Filed June 22, 1944 12 Sheets-Sheet 6

*INVENTOR.*
WILLIAM H. WANNAMAKER JR
*BY*
G.B. Spangenberg
ATTORNEY.

INVENTOR.
WILLIAM H. WANNAMAKER JR
BY
C. B. Spangenberg
ATTORNEY.

INVENTOR.
WILLIAM H. WANNAMAKER, JR.
BY
C. B. Spangenberg
ATTORNEY

*INVENTOR.*
WILLIAM H. WANNAMAKER JR.

*BY* C. B. Spangenberg

ATTORNEY

Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 10

INVENTOR.
WILLIAM H. WANNAMAKER JR
BY
C.B. Spangenberg
ATTORNEY.

INVENTOR.
WILLIAM H. WANNAMAKER JR.

BY C. B. Spangenberg

ATTORNEY.

Nov. 21, 1950 W. H. WANNAMAKER, JR 2,531,313

OSCILLATOR AND OSCILLATOR-CONTROLLED RELAY SYSTEM

Filed June 22, 1944 12 Sheets-Sheet 12

INVENTOR.
WILLIAM H. WANNAMAKER JR.
BY
C B Spangenberg
ATTORNEY.

Patented Nov. 21, 1950 2,531,313

UNITED STATES PATENT OFFICE 2,531,313

OSCILLATOR AND OSCILLATOR-CONTROLLED RELAY SYSTEM

William H. Wannamaker, Jr., Flourtown, Pa., assignor, by mesne assignments, to Minneapolis-Honeywell Regulator Company, Minneapolis, Minn., a corporation of Delaware Application June 22, 1944, Serial No. 541,575

22 Claims. (Cl. 175—320)

A primary object of the present invention is to provide an improved control system of the type in which control actions are effected through an electronic tube and associated means by which said tube is adapted to operate as an oscillator or not to so operate, accordingly as a controlling quantity or condition has one or another value. Such controlling quantity or condition may be a temperature, pressure, velocity, weight or other condition adapted to give movement to a control element on a small change in the value of the controlling quantity or condition.

Another primary object of the invention is to provide a control system including an electronic valve including a control grid with improved means for variably coupling the plate and grid circuits of the valve.

A more specific object of the invention is to provide a control system characterized by the high sensitivity of its response to changes in the position of the controlling element which determines whether or not the tube will oscillate. A further object of the invention is to effectively combine sensitive electronic tube responsive means with relatively rugged, simple and inexpensive electro-magnetic relay devices controlled by said tube.

A still more specific object of the invention is to provide oscillator control circuit improvements, and in particular to provide an electronic oscillator circuit adapted to be energized directly from an ordinary alternating current supply circuit without requiring a transformer coupling between the supply circuit and the oscillator circuit.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 1 is a diagrammatic representation of a control system embodying one form of my invention;

Figs. 2–8 inclusive, are diagrams each illustrating a different modification of the circuit arrangement shown in Fig. 1;

Figure 1:
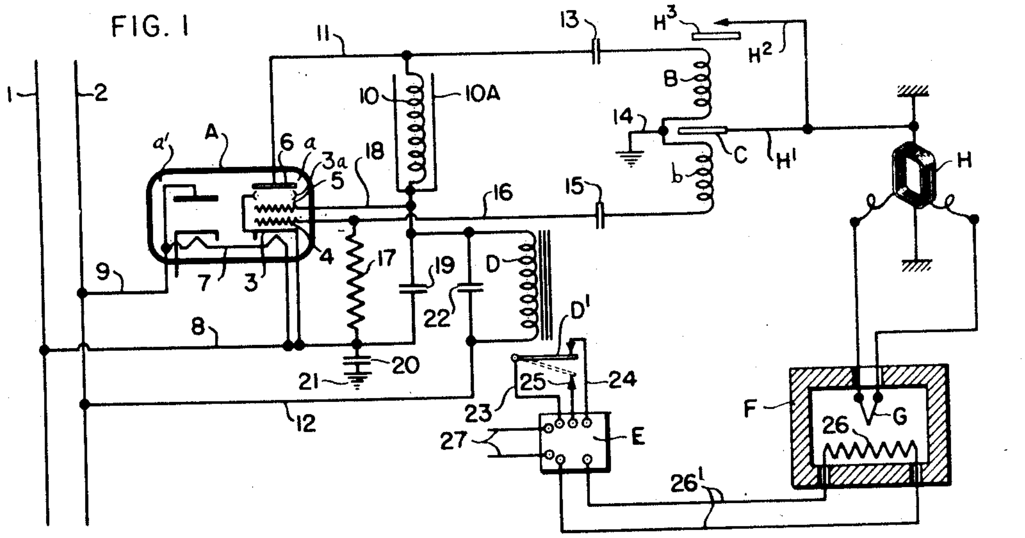

In Fig. 1, I have diagrammatically illustrated a simple embodiment of my invention comprising an electronic tube A which does or does not operate as an oscillator, depending on the mutual inductance of suitably disposed inductance coils B and b. The mutual inductance of said coils depends upon the position of an inductance shield or vane C movable into and out of a position in which it is directly interposed between the coils. The shield or vane C is formed of sheet metal such as aluminum, copper or brass of good electrical conductivity, and changes in its position relative to the coils B and *b* vary their mutual inductance in a known manner.

In the control system shown in Fig. 1, the operative effect of an adjustment of the vane C relative to the coils B and *b* which prevents oscillation of the tube A, is to permit the current flow in a relay winding D to build up and actuate a switch mechanism E to interrupt the supply of heating current to an electric furnace F. On a movement of the vane C which results in such an increase in the mutual inductance of the coils B and *b* that the tube A is set into oscillation, the switch mechanism E is actuated to supply heating current to the furnace F. In Fig. 1 the position of the vane C is controlled by a thermocouple G which is responsive to the temperature in the furnace F and is connected to a galvanometer or millivoltmeter H. The latter has a deflecting arm H' which carries the vane C and also carries a pointer $H^2$ deflecting over a scale $H^3$.

The electronic tube A shown in Fig. 1 is a rectifier-beam power amplifier tube of the type and form commonly known as the 117N7-GT tube, and comprises a tetrode valve or section *a* and a diode valve or section *a'*. The use of that particular tube is not essential to the practice of the present invention. In Fig. 1, no use is made of the diode valve section *a'* of the tube, though use is made of both sections of the tube A in other forms of the invention. In all forms of the invention I consider it desirable, if not essential, to employ a tube including a tetrode or other multigrid electronic valve *a* having a screen grid as well as a control grid. The screen grid acts as a shield between the anode and control grid elements of the valve *a* decreasing the capacitance between those elements, so that the tendency of the valve to oscillate due to inherent control grid to anode capacitance is eliminated or at least minimized. As a result, starting and stopping of the oscillations of the valve *a* are determined solely by the relative positions of the vane C and the coils B and *b*. In addition, the screen grid permits operation of the valve *a* at a higher frequency than would otherwise be possible because its use eliminates or minimizes the tendency of the inherent control grid to anode capacitance to maintain oscillations regardless of the position of the vane C. Oscillation of the valve *a* at such higher frequency is desirable because a given change in mutual inductance between the control coils B and *b* then produces a greater change in the amplitude of oscillation. In consequence, the screen grid contributes to the sharpness or sensitivity of the response of the valve *a* to movement of the vane in the range of its movement in which oscillation of the valve *a* is initiated and interrupted.

As shown in Fig. 1, the valve *a* which is energized by alternating current supply conductors 1 and 2, comprises a cathode 3 with beam plate extensions 3*a*, control grid 4, screen grid 5, plate or anode 6 and cathode heating filament 7. The terminals of the filament 7 are connected to the supply conductors 1 and 2 by conductors 8 and 9, respectively. The terminal of the cathode 3 is connected to the supply conductor 1 by the conductor 8. One terminal of the relay coil D is directly connected to the plate 6 through a conductor 11 and an inductance or choke coil 10 advantageously having an inductance shield 10A. A conductor 12 connects the coil D to the conductor 2. The coil B has one terminal connected to the plate 6 through the conductor 11 and a condenser 13, and has a ground connection 14 to its second terminal. The coil *b* has one terminal connected to the ground connection 14 and has its second terminal connected by condenser 15 and a conductor 16 to the control grid 4 of the tube A. The control grid 4 is connected to the cathode 3 by a high resistance 17. The screen grid 5 is directly connected by a conductor 18 to the terminal of the relay coil D which is connected to the anode 6, and is connected to said anode, therefore, through the coil 10 and conductor 11. The connected terminals of the choke coil 10, winding D and screen grid 5 are connected through a condenser 19 to the conductor 8, and thereby to the connected terminals of the cathode 3 and resistance 17 and to the supply conductor 1. As shown, the conductor 8 is connected through a condenser 20 to a ground connection 21.

As those skilled in the art will recognize, with the inductance coils B and *b* suitably proportioned and connected as shown in the circuit network of Fig. 1, the valve *a* will or will not operate as an oscillator, accordingly as the mutual inductance of the control coils is as great as, or is less than a certain critical value. For the purposes of the present invention the coils B and *b* shown in Fig. 1 are so disposed that when the vane C is interposed between substantial portions of the coils, their mutual inductance is reduced below said value.

The D. C. energizing current flowing through the relay winding D consists mainly of the plate current of the valve *a*, flowing through the coil 10, conductor 11, anode 6 and cathode 3. The relay power due to the plate current is desirably and significantly increased, however, by the screen grid current flowing through conductor 18, screen grid 5 and cathode 3. Ordinarily, the strength of relay D is increased not less than ten per cent by the screen grid current. When the valve *a* begins to oscillate the average voltage of the control grid 4 of the tube A becomes more negative and the energizing current flowing through the relay coil D is too small to operatively energize said coil, and the armature D' then connects the terminals 23 and 25 of the regulator switch E, and the latter connects the furnace heating resistor terminals 26' to supply conductors 27. When, as a result of a controlling condition change, the vane C is adjusted to reduce a mutual inductance of the coils B and *b* sufficiently to prevent valve *a* from oscillating, the energizing current flow through the winding D increases and operatively energizes the latter so that the armature D' is raised into the position in which it connects the terminals 23 and 24. The resultant actuation of the regulator E disconnects the terminals 26' from the supply conductors 27.

The ground connection 14 to the control coils B and *b* serves the practically important purpose of protecting a user against electrical shock through contact with the coils, as is apt to occur from time to time in adjusting and checking the performance of an instrument including the coils. For the contemplated oscillatory action in the circuit network, it is essential that the control coils be connected to the cathode 3 by a flow path of suitably low impedance to current flow of oscillation frequency. The condenser 20 of suitable capacity in the cathode ground connection provides such a flow path, while also providing an impedance to low frequency current flow high enough to effectively isolate the cathode 3 from ground.

Ordinarily the supply conductors supply current of 60 cycle frequency and one or the other of them is grounded, unless those conductors are connected to the secondary terminals of a transformer especially provided to avoid a ground connection. With a direct ground connection to the cathode 3 of Fig. 1, the supply conductors 1 and 2 would be directly short circuited by a ground connection to the conductor 2. With other forms of the invention, a direct ground connection to the cathode 3 would make the control system inoperative in other ways. For example, with a direct ground connection to the cathode 3 of Fig. 7, a ground connection to the supply conductor 1 would short circuit the relay coil D on itself and with a ground connection to the supply conductor 2 the coil D would short circuit the supply conductors.

In operation, when the galvanometer H adjusts the vane C to initiate or interrupt oscillation of the valve *a*, it thereby respectively decreases or increases the current flow through said valve with the result of respectively deenergizing or energizing the relay D. The furnace temperature at which the oscillation is initiated or interrupted may be given different predetermined values by suitable "control point" adjustments of the apparatus. The control instrument shown in Figs. 9–14 and hereinafter described, includes one simple means for effecting such "control point" adjustments.

The control system shown diagrammatically in Fig. 1 is characterized by its inherent simplicity, reliability and capacity for operation with high sensitivity. With the control coils B and *b* in the form of flat, closely spaced spirals, as illustrated in Figs. 9–14 and hereinafter described, it is practically feasible to proportion and design the system so that the tube A will be rendered oscillating or non-oscillating, by a movement of the portion of the edge of the vane C adjacent the common axis of the coils B and *b*, which is not greater than one-thousandth of an inch. By way of example, and not by way of limitation, it is noted that in one practical embodiment of the control system of Fig. 1, the capacitances of the condensers 13 and 15 are 0.00005 and 0.00007 mfd., respectively; and the capacitance of each of the condensers 19 and 20 is 0.001 mfd., though the capacitance value of neither is critical. The capacitance of the condenser 22 is 2.0 mfd. The capacitances of the condensers 13 and 15 with the capacitance of the tube A and the distributed capacitances of the circuit elements provide the capacitance in the series resonant circuit portions of the system. The condensers 13 and 15 also serve as blocking condensers preventing risk of injurious current flow through coils B and *b*, due to the normal 60 cycle, 110–120 volts between the supply conductors 1 and 2. The condensers 19 and 20 serve as by-pass condensers and their respective capacitances are not critical.

The simple control system arrangement shown in Fig. 1, in certain applications, is open to the objection that since current is supplied to the heating resistor 26 of the furnace F when the current flow through the winding D is too small to attract the armature D′, armature D′ will be in the position required for the supply of current to the furnace, not only when the furnace temperature is low, but also when the control system is rendered inoperative, as by an interruption in the supply of current by the conductors 1 and 2 or by the failure of the tube filament 7. This objection to the circuit arrangement shown in Fig. 1 may be avoided in various ways, one of which is shown in Fig. 2.

Figure 2:
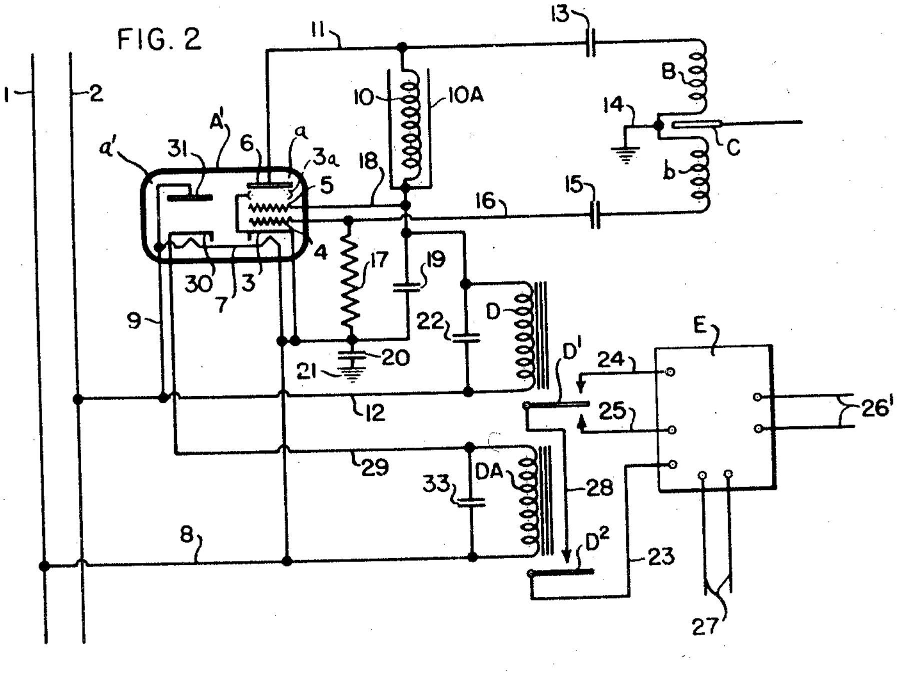

The control system shown in Fig. 2 differs primarily from that shown in Fig. 1 as a result of its inclusion of a second relay DA energized by the space current flow in the diode section of the tube A. The relay DA prevents the engagement of the relay armature D′ with the terminal conductor 25 of the switch mechanism E from producing the operative effect which it produces in Fig. 1, except when the relay DA is operatively energized. To this end the connection of the armature D′ to the regulator terminal 23 is controlled by the position of the armature $D^2$ associated with the relay coil DA. The armature $D^2$ is connected to the conductor 23 and connects the latter to the relay armature D′ when, and only when, the energization of the coil DA moves the armature $D^2$ into engagement with one end of a conductor 28 which has its other end connected to the armature D′.

The energization of the relay coil DA is made dependent on the operativeness of the tube A by virtue of the fact that said coil DA is included in the diode plate circuit of the diode section of the tube. To this end, as shown, the coil DA has one terminal connected through the conductor 8 to the supply conductor 1 and has its other terminal connected by a conductor 29 to the diode-cathode 30. The diode anode or plate 31 is connected to the supply conductor 2 through conductors 9 and 12. As shown, a by-pass condenser 33 is connected in shunt to the coil DA. The coil DA of Fig. 2 can thus be energized only when the supply conductors 1 and 2 maintain current flow through the diode section of the tube A, and unless the coil DA is energized the armature D′ cannot connect the terminals 23 and 25 of the regulator E, so that the latter may energize the associated heating resistance 26.

In Fig. 3, I have illustrated a modified form of control system which differs from those shown in Figs. 1 and 2 in that in Fig. 3 the diode valve section *a′* of the duplex tube A is arranged to impress a pulsating D. C. voltage on the plate circuit of the tetrode valve section *a* of the tube. Fig. 3 also includes means differing from those shown in Fig. 2 for preventing the regulator E from supplying current to the heating resistance terminals 26′ when the tube A is inoperative.

The arrangement shown in Fig. 3 is like that shown in Fig. 2 in that it includes two relays D and DA. In Fig. 3, however, the armature switch $D^2$ of the relay DA cooperates with the terminals 23, 24 and 25 of the regulator E to directly actuate the latter, and the energizing circuit for the relay coil DA includes the armature D′ of the relay D and the relay coil DA can be energized only when the relay D is unenergized. One terminal of the coil D of Fig. 3 is connected to the plate 6 of the valve *a* through the coil 10 as in Figs. 1 and 2, but in Fig. 3 the second terminal of the coil D is connected by a conductor 34 to the diode cathode 30 and thence through the diode plate 31 and conductor 9 to the supply conductor 2. One terminal of the relay coil DA is connected through a resistance 38 to the conductor 34. The second terminal of the coil DA is connected to the armature D′ of the relay coil D and when the latter is deenergized, the armature D′ engages the end of conductor 36 and through the latter is connected to the supply conductor 1. The conductor 36 is connected to one terminal of the filament 7 and to the cathode 3 by the conductor 35. A condenser 37 connects the diode cathode 30 to the conductor 36 and thereby to the supply conductor 1 and thus insures D. C. operation of the valve *a*.

When the coil D of Fig. 3 is energized and attracts its armature D′, the relay coil DA is deenergized and its armature D² connects the terminals 23 and 24 of the regulator E and actuates the latter to prevent the supply of current to the heating resistance terminals 26′. When, as a result of the oscillation of the valve *a*, the relay coil D is deenergized its armature D′ drops and connects the relay coil DA to the supply conductor 1. This results in the energization of the coil DA if, and only if, the diode section of the tube A is operative. When the coil DA is energized its armature D² is moved to connect the terminals 23 and 25 of the regulator E and the latter is thereby actuated to supply current to the heating resistance terminals 26′. The system shown in Fig. 3 thus has the safe operating characteristic possessed by the system shown in Fig. 2 but lacking in the system shown in Fig. 1. The impression of D. C. voltage on the grid valve plate 6, as provided for in Fig. 3, tends to somewhat greater control system sensitivity than is characteristic of control systems like those shown in Figs. 1 and 2 in which A. C. voltage is impressed on said plate. The arrangement shown in Fig. 3 is well adapted for use with heavy duty switch contacts and with the current passing to the valve *a* through the diode rather than direct from the power line, a safe failure should always result from a filament burnout.

In Fig. 4 I have illustrated a control system modification including only a single relay D but having the safe operating characteristic lacking in the Fig. 1 system, and obtained in the system shown in Figs. 2 and 3 by means including a second relay DA. Safe operation is obtained in Fig. 4 by means through which the effect of the oscillation of the multi-grid valve *a* on the energization of the relay D is made the reverse of the oscillation effect of the valve in the circuits shown in Figs. 1, 2 and 3. Thus in Fig. 4, movement of the vane C into the position in which the mutual inductance of the coils B and *b* is high enough to set the valve *a* into oscillation, results in the energization of the relay coil D. The armature D′ of the coil D of Fig. 4 is associated with the terminals 23, 24 and 25 of the regulator E and actuates the latter when attracted and is allowed to drop back exactly as in the armature D² of Fig. 3.

The oscillation of the valve *a* of Fig. 4 results in the energization of the relay coil D in consequence of the fact that the impedance of said valve is shunted across the relay coil D. When the valve *a* begins to oscillate, the potential drop in a resistance 39 included in series with the coil D in the plate circuit of the diode valve of the tube A, and also included in the plate circuit of the valve *a*, diminishes and thereby increases the current flow through the coil D so as to energize the latter. In Fig. 4, the resistance 39 connects the connected terminals of the choke coil 10 and coil D to the diode cathode 30 and the conductor 40 connects the second terminal of the coil D to the supply conductor 1. The cathode 30 is connected to the conductor 40 by a condenser 41, and the conductor 40 and its branch 42′ connect the supply conductor 1 to the cathode 3 of the valve *a* and to one terminal of the filament 7.

The regulator E of Fig. 4 is thus actuated to supply or to interrupt the supply of current to the heating resistance terminals 26′, accordingly, as the coil D is or is not energized.

In Fig. 4 as in Fig. 3, the diode valve impresses a pulsating D. C. potential on the plate 6 of the valve *a* and thus tends to make the operation of the oscillating tube more sensitive than when A. C. potential is impressed on its anode. While inherently less sensitive than the system shown in Fig. 1, the Fig. 4 system is well adapted for use in effecting control operations such as three position control operations which do not require the high sensitivity obtainable with the Fig. 1 system.

Figure 5:
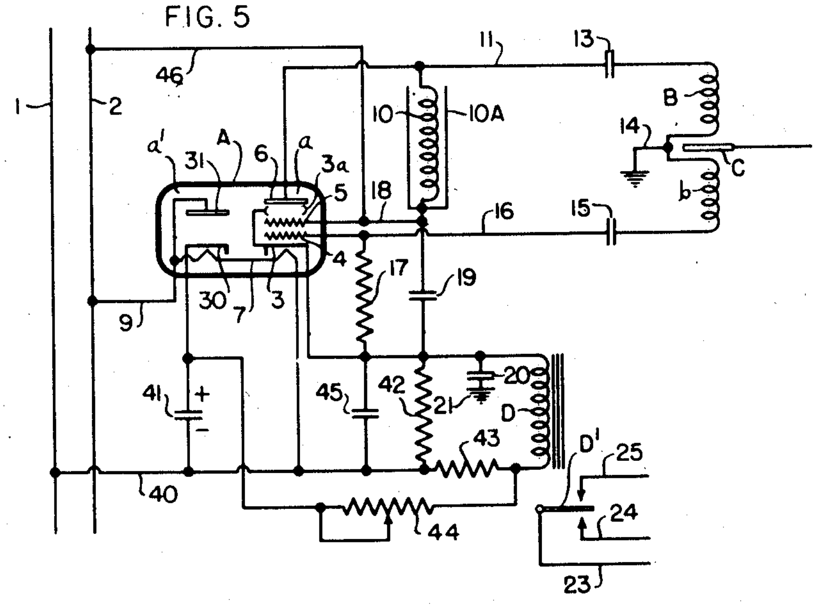

In Fig. 5 I have illustrated a system which differs somewhat from that shown in Fig. 4 but is like the latter in that oscillation of the valve *a* of the tube A effects energization of the relay coil D and thus insures safe operation in case of failure of the filament 7 or of the power supply lines. In Fig. 5 the energization of the relay D depends directly upon unbalance of the respective voltage drops in resistances 42 and 43. The resistances 42 and 43 each have one terminal connected to the supply conductor 1 through a conductor 40 which is common to the plate circuits of the two valves. The second terminal of the resistance 43 is connected to one terminal of the relay coil D and the other terminal of that coil is connected to the second terminal of the resistance 42. The connected terminals of the coil D and resistance 43 are connected to the diode cathode 30 through a variable resistance 44. The cathode 30 is connected to the conductor 40 through a condenser 41, and a condenser 45 connects the conductor 40 to the connected terminals of the resistance 42, coil D, resistance 17 and cathode 3 of the valve. The plate 6 of the valve *a* is connected to the supply conductor 2 through a circuit branch including a conductor 46, choke coil 10 and conductor 11.

As will be apparent, each of the resistances 42 and 43 unites with the relay coil D to form a shunt about the other of said resistances. In consequence, the voltage drop in each of the resistances 42 and 43 tends to cause a current flow through the coil D in a direction opposite to the direction of the current flow in the coil which the voltage drop in the other resistance tends to cause. The resistances 42 and 43 are so proportioned that when the valve *a* is not oscillating, the tendency of each of the resistances 42 and 43 to produce current flow through the coil D is substantially neutralized by the tendency of the other resistance to create a current flow in the opposite direction through the coil D. In consequence, the coil D is unenergized when the valve *a* is not oscillating. When the adjustment of the vane C sets the valve *a* into oscillation the voltage drop in the resistance 42 is so reduced that the voltage drop in the resistance 43 then causes sufficient current flow in the coil D to energize the latter. The resultant attraction of the armature D′ connects terminals 23 and 25 of the regulator E which is thereby actuated to supply current to the heating resistance terminals 26′.

The relay D of Fig. 5 is extremely sensitive in its response to the voltage changes produced by the movements of the vane C, but the relay is inherently of small power. It may be used with advantage in some cases as a pilot relay, however, and when used, the resistance 44 constitutes a convenient means for the electrical adjustment of the control point temperature or other controlling condition value which the system tends to maintain.

Figure 6:
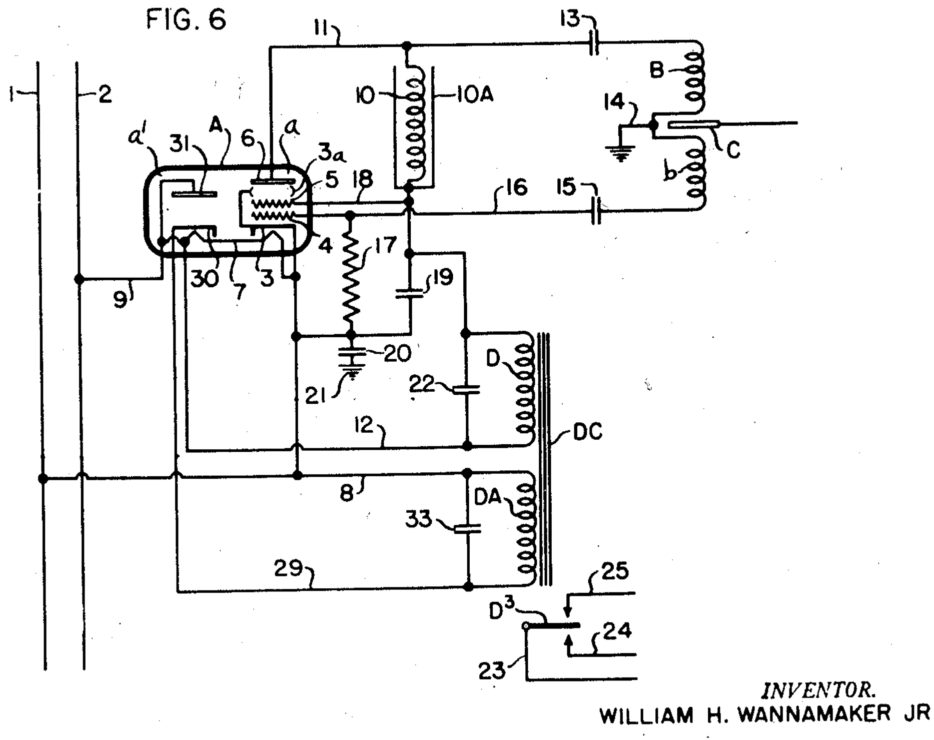

In Fig. 6, I have illustrated a control system which in respect to most of its elements resembles the system shown in Fig. 2 but in its operative results is more like the system shown in Fig. 5. In Fig. 6, two relay coils D and DA form the bucking winding sections of a differential electromagnetic relay DC in which the constant plate current of the diode valve *a'* opposes the varying space current of the valve *a*. The armature switch $D^3$ of the relay DC is associated with the terminals of the regulator E just as the armature switch D' of Fig. 5 is associated with those terminals. When the valve *a* is oscillating, the current in the coil DA is substantially larger than the current in the coil D and energizes the relay DC so that its armature $D^3$ connects the terminals 23 and 25 of the regulator E. When the valve *a* is not oscillating, the current in the coil D is larger and substantially neutralizes the relay energizing effect of the coil DA so that the relay DC is deenergized and the armature $D^3$ then connects the terminals 23 and 24 of relay E.

Figure 7:
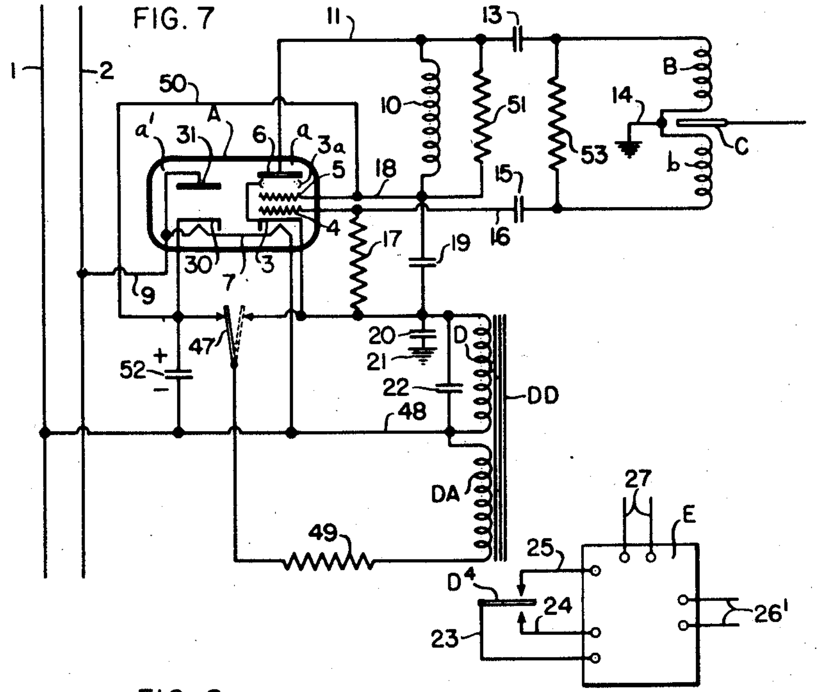

In Fig. 7, I have illustrated a form of my invention which I now consider generally preferable to the forms shown in Figs. 1–6 inclusive, although in various general respects the system shown in Fig. 7 does not differ from those shown in Figs. 1–6. The system shown in Fig. 7 is adapted for operation in two different ways dependent on the adjustment of a switch 47. When the switch 47 is in its full line position, the system shown in Fig. 7 operates in the same general manner as does the system shown in Fig. 6. In Fig. 7 the two relay coils D and DA, which form part of a single differential electromagnetic relay DD, have their adjacent terminals connected so that they may form end to end sections of a single coil structure which has a center tap conductor connection 48 to the supply conductor 1. The second terminal of the coil DA is connected to the switch 47 through a resistance 49. The cathode 30 of the diode valve is connected to the plate 6 of the valve *a* through a conductor 50, the choke coil 10 and a resistance 51 in shunt to the choke coil 10, and the conductor 11. A condenser 52 connects the cathode 30 to the conductor 48 and thereby to the supply conductor 1, and a pulsating D. C. potential is thus impressed on the plate 6.

The control system shown in Fig. 7 is so designed and proportioned that in normal operation with the switch 47 in its full line position, the relay DD is deenergized or energized accordingly as the valve *a* is not or is oscillating. With the switch 47 in its full line position, a portion of the plate current of the diode valve *a'* flows through the coil DA, and another portion namely the space current of the multi-grid valve *a* flows in series through that valve and through the coil D. When the valve *a* is not oscillating the current flow through the coil D is sufficient to neutralize the effect of the current flow through the coil DA and deenergize the relay DD. When the valve *a* oscillates, its space current diminishes and the relay DD is then energized by the greater current flow through the coil DA. The armature $D^4$ of the relay DD connects the terminal 23 of the regulator E to the regulator terminal 24 or 25 accordingly as the relay DD is deenergized or energized.

When the switch 47 is in its dotted line position, the relay coil sections D and DA are connected in parallel in the plate circuit of the valve *a*, and the branch circuit then including the coil D, and the branch circuit including the coil DA and resistance 49 are so proportioned that the relay energizing effect of the coil D exceeds that of the coil DA. The excess energizing effect of the coil D is not sufficient to operatively energize the relay DD however, except when the valve *a* is not oscillating and the plate current of that valve is relatively large.

The condenser 52 connected as shown insures D. C. oscillation operation of the valve *a*, and thus, as previously explained, contributes to operational stability. The relay DD is responsive to very small changes in the total current flow through its coils D and DA, and operates safely in case of tube or power-line failure with the switch 47 in either of its two operating conditions. This makes it practically possible, as is advantageous in some cases, to energize and deenergize the relay DD on and as a result of changes in the mutual inductance of the control coils B and *b* without decreasing their mutual inductance sufficiently to cause the valve *a* to stop oscillating.

In Fig. 7 the terminals of the control coils B and *b* respectively connected to the condensers 13 and 15 are connected by a resistor 53 which is employed to insure substantially complete stability of the oscillator system and to positively prevent the valve *a* from oscillating when the vane C is fully inteposed between the coils B and *b*. I have experimentally determined that the sensitivity of the response of a practical form of the control system shown in Fig. 7 to movement of the vane C is not affected by the use of the resistor 53, if the resistance of the latter is above 10,000 ohms. The degenerative effect of the resistance 53 is especially desirable in the case of a multi-oscillator system which may be used for three position control as hereinafter described, or where a double pen system is employed.

While the use of the resistance 53 is not imperative, it is advantageous and has the practical advantage of increasing the permissible mechanical tolerances in respect to the spacing of the two control coils B and *b* relative to one another and to the cooperating vane C. The stabilizing effect of the resistance 53 is attributable in large part at least to the fact that it minimizes the effect of the capacitance of the conductor connections to the control coils B and *b*. The resistance 51, when provided, increases the tolerances permissible in positioning the control coils relative to one another and the vane C. Resistance 51 reduces the ratio of inductance to resistance of the circuit including the choke coil 10 and this operates to limit the effective impedance of the circuit into which the anode 6 works to some value less than the value of the resistance 51. Resistance 51 may desirably have a value of 3,000 ohms. When resistance 51 is employed, the shield on choke coil 10 may be omitted since there is then no tendency for the circuit to resonate at the natural frequency of the choke coil 10. Accordingly, control of the starting and stopping of the oscillations of valve *a* resides solely in the relative positioning of the vane C and the coils B and *b*. The advantages obtainable by the use of each of the resistances 51 and 53 shown in Fig. 7 is not restricted to the particular control system shown in Fig. 7 in distinction to the control systems shown in Figs. 1–6 and Fig. 8 as well as in other forms hereinafter described.

Figure 8:
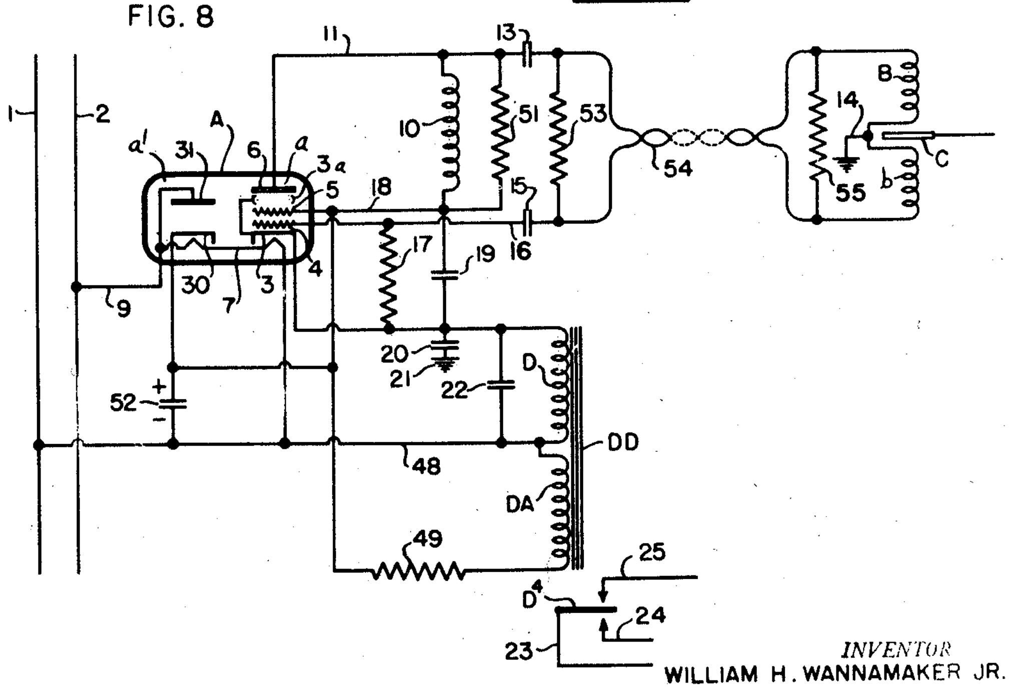

In Fig. 8 I have illustrated a control system of the same general character as the system of Fig. 7 when its switch 47 is in its full line position. The Fig. 8 system differs from the Fig. 7 system, however, in having its control coils B and b connected to the condensers 13 and 15 by twisted leads 54 as shown in Fig. 8. This is desirable when the control coils are at a considerable distance from the condensers. In such case I have found it desirable to connect the leads by a resistance 53 adjacent the condensers 13 and 15 as in Fig. 7 and to also connect said leads at points adjacent the control coils by a small lumped capacity or as shown in Fig. 8 by a resistance 55.

My present invention in any of the forms shown in Figs. 1–8 is well adapted for use in compact and effective control instruments, and in Figs. 9–14 I have illustrated an instrument HA of especially desirable form embodying a control system of the form shown in Fig. 7. The vane CA of the instrument HA, which differs in form from the vane C, is an arc shaped body of sheet metal of good conductivity such as aluminum, copper or brass attached to a pivoted support 60. The latter is mounted on a horizontal pivot 61 carried by the mechanism casing 62 and is suitably counter-weighted to free the vane from gravitational bias. The inductance coils B and b are flat spirals each mounted on an individual support 63 and comprising a few convolutions only. As shown, each coil includes 5½ turns, but I have obtained good results with as many as 11½ convolutions in each coil. In the preferred form illustrated, the two supports 63 are counterparts, each being a plate-like body of insulating material deformed to provide a circular boss or projection 64 at one side about which the corresponding coil B or b is wound. The coil terminals extend through and are anchored by cement in holes formed in the support 63, and in practice, the body of each of the coils B and b is anchored to the corresponding support 63 by cement. One terminal of each coil passes away from the corresponding coil support 63 through a grommet 65 in the latter. The two coil supports 63 are advantageously connected to form a single mechanical unit by a metallic eyelet or hub part 66 which extends through a portion of each support displaced from its bosses 64. As shown, the unit including one coil B and one coil b and their supports 63 is detachably secured by a clamping screw 68 to the end of a post portion 69 of the casing 62.

The inductance coil construction just described is mechanically simple and relatively inexpensive, and permits the coils B and b to be spaced accurately and desirably from one another. For example, the distance between the bosses 64 may be one-sixteenth of an inch. In consequence a very small angular movement of the thin sheet metal vane CA may produce a relatively large change in the mutual inductance of the coils although each of the latter comprises but a few turns or convolutions.

Figure 9:
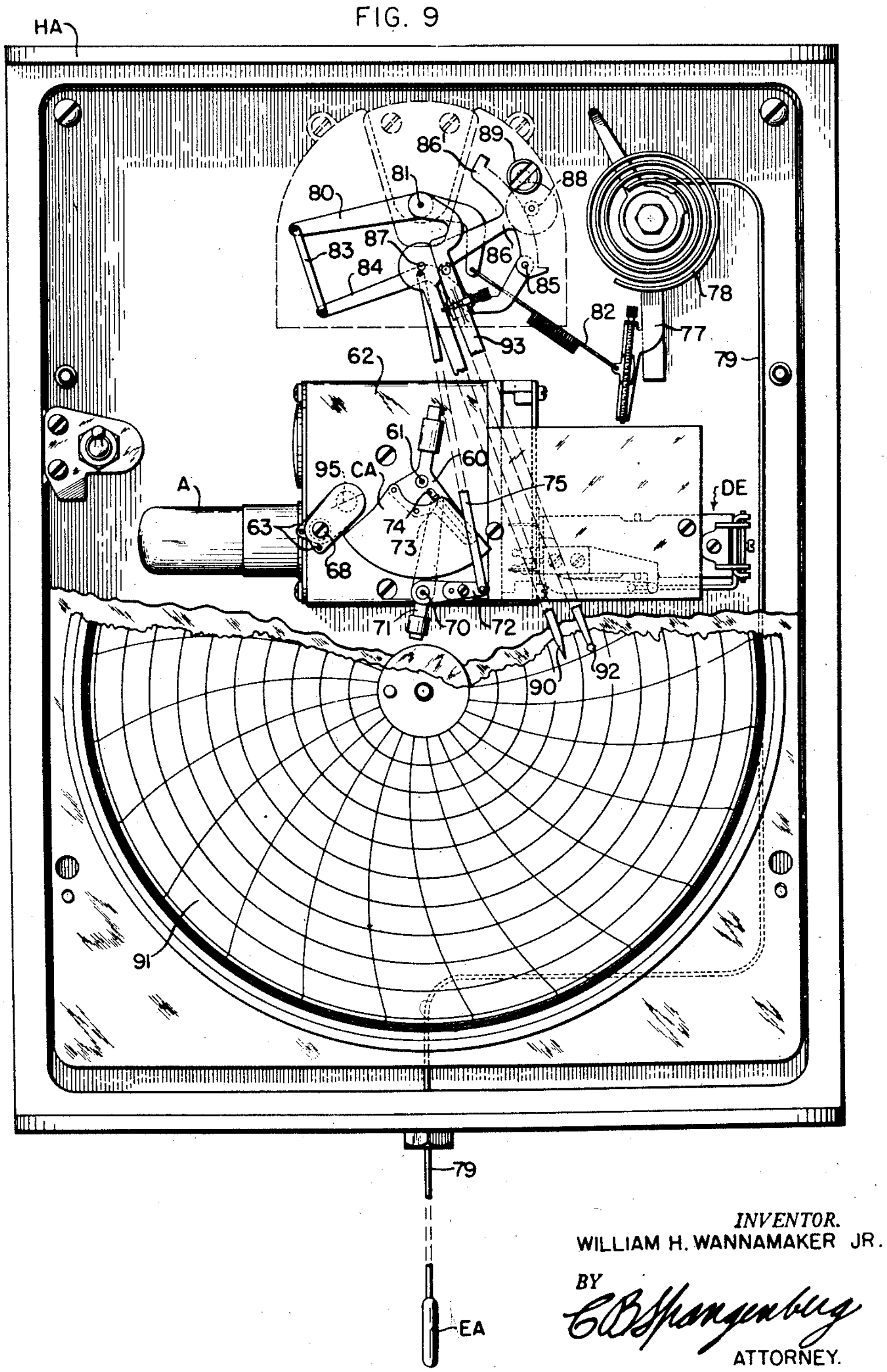
Fig. 9 is an elevation with parts broken away, illustrating a control instrument adapted for use in connection with the control circuit arrangement shown in any of Figs. 1–8.

In the instrument shown in Fig. 9, the vane CA is oscillated about the pivot 61 through a pin and slot connection between the vane support 60 and a rocker or lever element mounted on a pivot pin 70 and comprising two lever arms 71 and 72. The arm 71 carries a pin 73 received in an elongated slot 74 formed in the vane support 60 and extending in a general radial direction away from the pivot 61. The second arm 72 of the rocker element 70 is pivotally connected to one end of an actuating link 75 which has its second end connected through a lever and link arrangement of known type to an arm 77 oscillating in accordance with changes in the value of the controlling condition. As shown in Fig. 9, the arm 77 is connected to the free end of a Bourdon tube 78 which has its other end anchored to the instrument casing and connected to one end of a capillary tube 79 through which a variable controlling fluid pressure is transmitted to the Bourdon tube 78. In consequence, the arm 77 oscillates about the axis of the Bourdon tube in the clockwise or counter-clockwise direction, as the pressure transmitted by the capillary 78 respectively decreases or increases.

The known type of link and lever arrangement through which the link 75 is adjusted longitudinally in accordance with angular adjustments of the arm 77, comprises a lever element 80 journalled on a pivot 81 carried by the instrument casing and having one arm connected by a link 82 to the arm 77. A second arm of the lever 80 is connected by a link 83 to one end of a floating lever 84. The other end of the floating lever 84 is pivotally connected by a pivot 85 to a control point adjusting element 86. The latter is pivotally mounted on a pivot pin 87 carried by the instrument casing. The element 86 may be angularly adjusted about the pivot 87 by means including a spur gear 88 in mesh with a spur gear portion 86′ of the member 86. The spur gear 88 may be rotated by gearing including an adjusting shaft 89 journalled on the instrument casing and shown as formed with a kerf in one end for screw driver adjustment. The end of the link 75 remote from the rocker arm 72 is pivotally connected to the floating lever 84 intermediate the ends of the latter. The member 86 includes an index arm 90 which indicates on the rotating instrument chart 91 the control point or value which the instrument is intended to maintain approximately constant. The actual value of that control condition is indicated and recorded on the chart 91 by a pen 92 carried at the free end of a pen arm 93 mechanically connected to the lever 80 so as to turn about the pivot 81 in accordance with changes in the value of the pressure transmitted by the capillary 79.

The Bourdon spiral 78 may be connected through the capillary tube 79 to any controlling fluid pressure source. Thus, for example, that source may be a fluid pressure thermometer bulb EA as shown in Fig. 9 and the instrument HA may then be employed in such a control system as is shown diagrammatically in Fig. 1 to give the vane CA oscillatory movements relative to the coils B and b on changes in the temperature of the bulb EA, which are similar to the relative movements of the vane C and coils B and b produced in the particular arrangement shown in Fig. 1 by the response of the galvanometer H to variations in the voltage of thermocouple C.

Regardless of the origin of the controlling pressure transmitted by the capillary 79 to the Bourdon tube 78, on a decrease or increase in said pressure, the arm 77 operates through its lever and link connection to the rocker arm 72 to turn the vane CA respectively clockwise or counter-clockwise about the pivot 61.

The exact angular position into which the vane CA must turn to interrupt the oscillation of the valve a will obviously depend on various control system constants. Ordinarily, however, it will be a position in which the left-hand edge of the vane, as seen in Fig. 9, extends through the space between the bosses 64 of the two coil supports 63, along or near the dotted line 95 of Fig. 9. Control apparatus comprising an electronic valve adapted to be adjusted into or out of an oscillating condition by changes in the relative positions of an inductance shield vane and inductance coils generally as shown in Figs. 9–14 may be so constructed and arranged that a movement of the edge of the vane CA in a direction transverse to the dotted line 95, of the magnitude of one-thousandth of an inch will be sufficient to cause the value $a$ to oscillate or to cease from oscillation.

With the pin and slot connection between the rocker arm 71 and the vane CA shown in Fig. 9, the ratio of the angular movements of the vane to that of the rocker arm is relatively very large when the pin 73 is close to the pivot 61 and is movement is generally transverse to the plane including the axes of the pivots 61 and 70 and said ratio diminishes as the pin moves away from said pivot. Advantage of the pin and slot connection characteristic just mentioned may be taken to make the instrument especially sensitive to movement in the portion of its range of movement in which such sensitivity is especially important. Generally, maximum sensitivity is desirable when the vane is in or near the position at which oscillation begins and stops.

Figures 10, 11, 14:
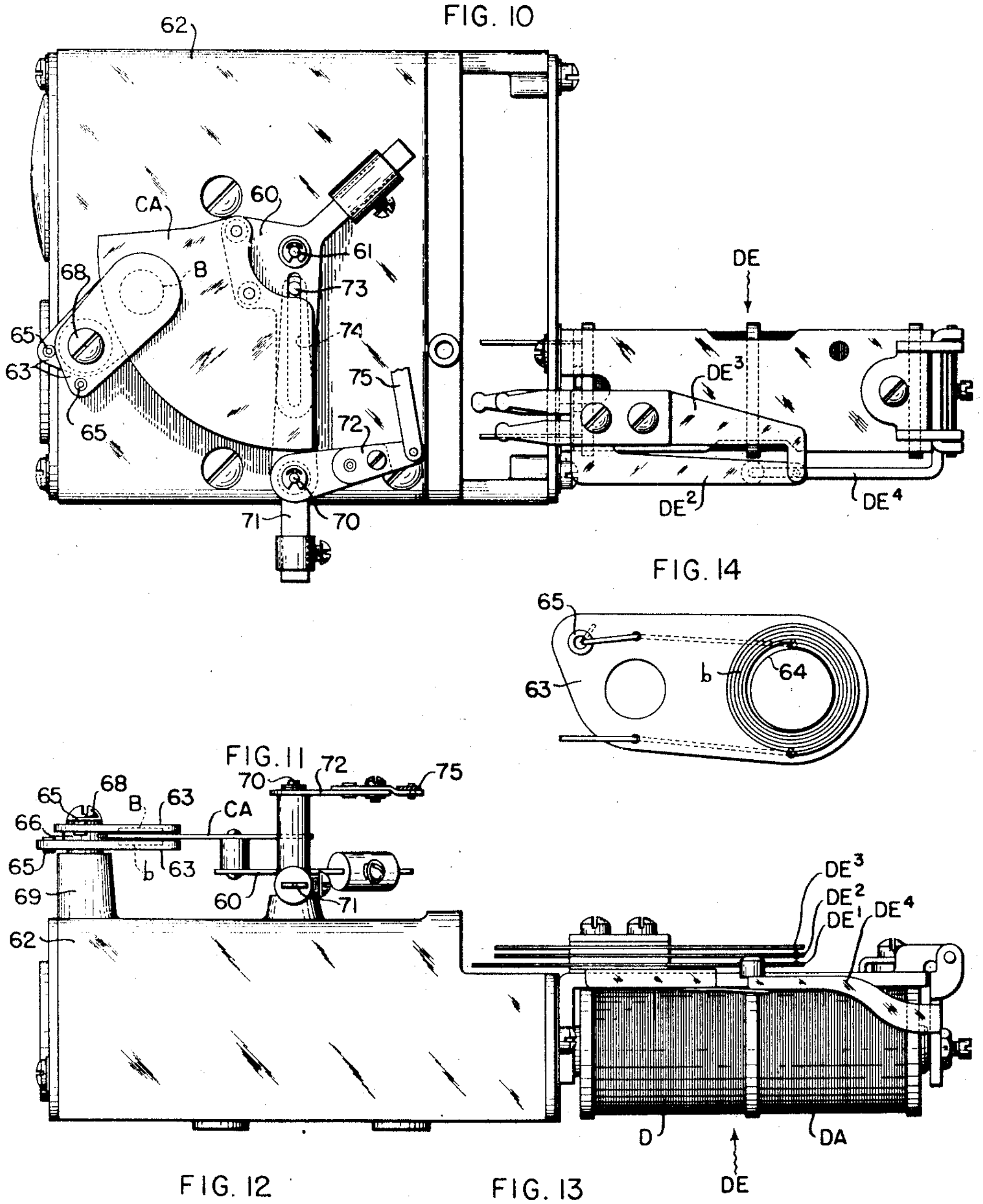
Fig. 10 is an elevation on a larger scale of a portion of the apparatus shown in Fig. 9.
Fig. 11 is a view taken at right angles to Fig. 10.
Fig. 14 is an elevation of one of the control coils shown in Fig. 12.
Figure 12:
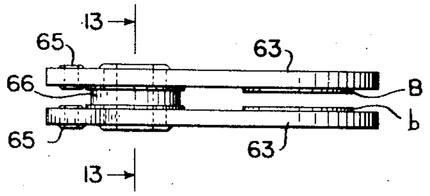
Fig. 12 is an enlarged reproduction of a portion of Fig. 11.
Figure 13:
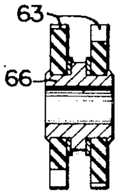
Fig. 13 is a section on the line 13—13 of Fig. 12.

The instrument HA advantageously includes relay mechanism of suitable form through which the instrument effects control operations. As shown, the instrument HA includes a differential relay DE which is operatively like the relay DD and comprises resilient switch contacts $DE^2$, $DE^1$ and $DE^3$ corresponding operatively to the armature $D^4$ and control terminals 24 and 25, respectively, of Fig. 7. The contact $DE^2$ is biased to engage the contact $DE^1$ but is moved out of engagement with that contact and into engagement with the contact $DE^3$ by the armature $DE^4$ when the relay DE is energized as shown in Fig. 11.

Figures 15, 16, 17, 18, 20:
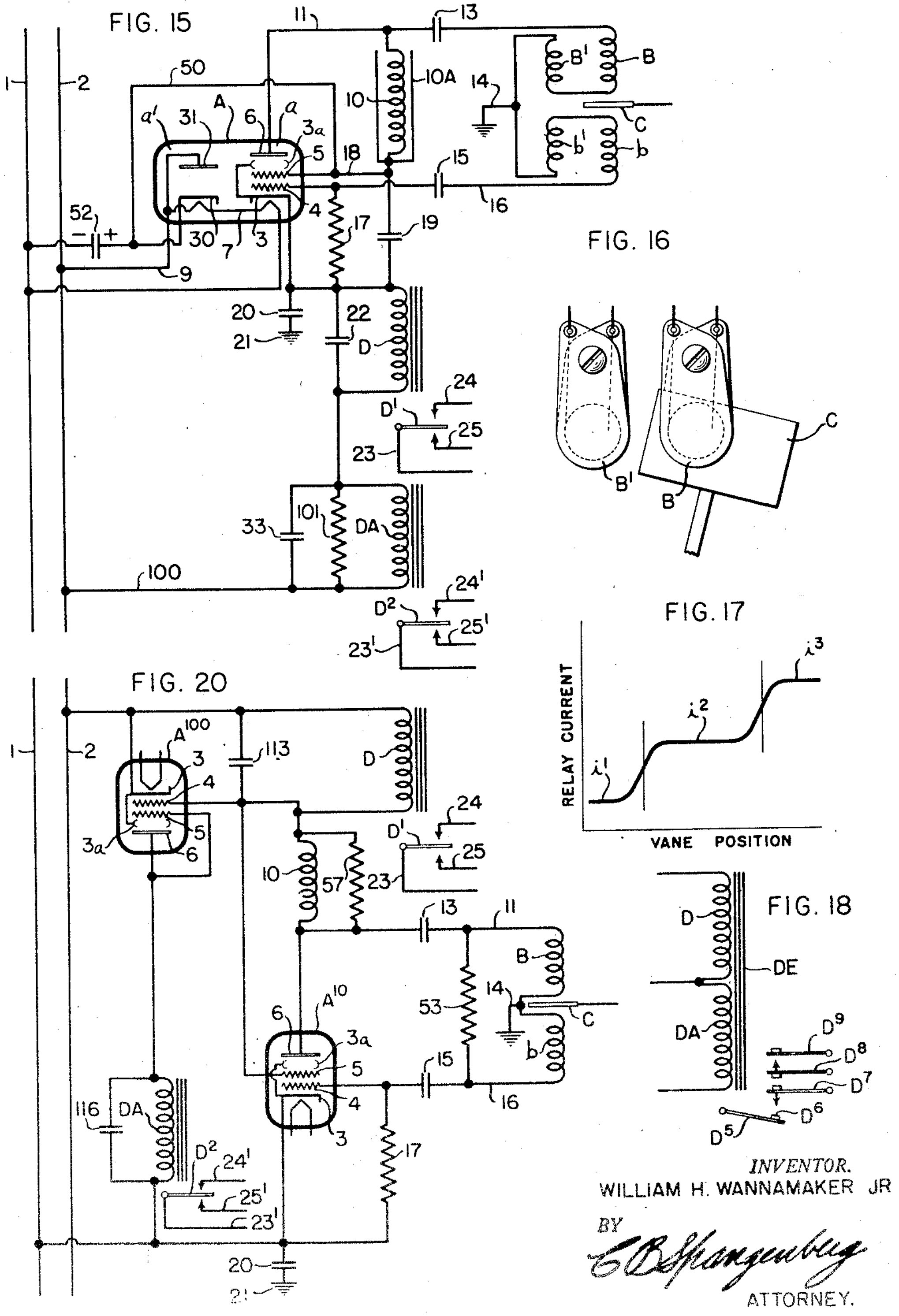
Fig. 15 is a diagram showing a circuit arrangement adapted for use in a three position control system.
Fig. 16 is a diagrammatic view, taken at right angles to Fig. 15, of the control coils and vane of Fig. 15.
Fig. 17 is a diagram illustrating variations in plate current produced in the operation of the apparatus shown in Fig. 15.
Fig. 18 is a diagram showing a modification of the electro-magnetic switch arrangement shown in Fig. 15.
Figs. 19, 20 and 21 are diagrams illustrating different modifications of the three position control system shown in Fig. 15.

In Figs. 15 and 16, I have illustrated a control system for effecting a three-position control through switch mechanism including two selectively actuated relay coils D and DA, adapted when energized to adjust corresponding movable switch contact or armature members D' and $D^2$, respectively. In respect to its control coils and their association with a tube A, the control system shown in Fig. 15 differs from those previously described, essentially in that it includes a pair of control coils B' and $b'$ in addition to a pair of control coils B and $b$ so associated with the control vane C that the latter has three operative positions.

As shown, the coils B' and $b'$ are alongside the coils B and $b$ respectively, and when the vane C is in its intermediate or neutral position, shown in Figs. 15 and 16, the vane extends between and substantially minimizes or eliminates the mutual inductance of the coils B and $b$ without extending between and significantly reducing the inductance of the boils B' and $b'$. When the vane C is moved to the right from the position shown in Figs. 15 and 16 into its "low" position, it permits the mutual inductance of the coil B and $b$ to increase to its full value. When the vane C is moved from the position shown in Figs. 15 and 16 into its left-hand or "high" position, it eliminates or substantially minimizes the mutual inductance both of the coils B' and $b'$ and of the coils B and $b$.

The coils B and B' of Fig. 15 are connected in series between the condenser 13 and ground connection 14, and the coils $b$ and $b'$ are connected in series between ground connection 14 and condenser 15.

In Fig. 15, the relay coils D and DA are connected in series between the cathode 3 of the valve $a$ and branch 100 of supply conductor 2 and a resistance 101 is connected in shunt to the coil DA. Ample voltage for energizing the series connected relays D and DA is insured, as hereinafter explained, by connecting the diode plate 31 and grid valve cathode 3 to the supply conductor 2 and by connecting the diode cathode 30 and the anode 6 of the valve $a$ to the supply conductor 1 through a condenser 52. As shown, the cathode 30 is directly connected to the condenser 52 and the latter is connected to the anode 6 through the conductor 50, choke coil 18 and conductor 11.

In the contemplated operation of the apparatus shown in Fig. 15, the current flow through the relay coils D and DA will be too small to energize either relay coil when the vane C is in its right hand or "low" position in which the vane does not significantly reduce the mutual inductance of either pair of control coils and the valve $a$ then oscillates with a relatively high frequency. On movement of the vane C into its intermediate or "neutral" position in which it substantially minimizes or eliminates the mutual inductance of the coils B and $b$ without significantly minimizing the mutual inductance of the coils B' and $b'$, the amplitude of oscillation of the valve $a$ is reduced and the current flow through the valve $a$ and relays D and DA increases sufficiently to operatively energize the relay D but is still too low to operatively energize the less sensitive relay DA. When the relay D is thus energized its associated armature switch element D' is moved out of the position in which it connects the control terminals 23 and 25 and into the position in which it connects the terminals 24 and 23. When the vane C moves to the left from its position shown in Fig. 15 into the position in which it substantially minimizes or eliminates the mutual inductance of the control coils B' and $b'$ as well as of the coils B and $b$, the oscillation of the valve is interrupted and the current flow through the coils D and DA is so increased that the relay DA is operatively energized. In consequence, the armature switch element $D^2$ is then raised to disconnect the terminals 23' and 25' and to connect the terminals 24' and 23'. On a reverse movement of the vane from its left hand or "high" position into its "neutral" position shown in Fig. 15, the relay energizing current is sufficiently reduced to deenergize the relay coil DA without deenergizing the coil D, and the armature $D^2$ then drops back into engagement with the terminal 25'. Movement of the vane C to the right of its position shown in Fig. 15 so deenergizes the coil D that the armature D' drops into engagement with the terminal 25.

The variations in the relay current produced by the adjustment of the vane C of Fig. 15 into its three different positions as just described are illustrated diagrammatically in Fig. 17 wherein the horizontal curve sections $i'$, $i^2$ and $i^3$ represent the "low," "intermediate" and "high" values of the relay current maintained when the position of the vane C is such that it respectively (1) does not significantly reduce the mutual inductance of either pair of control coils, (2) substantially eliminates the mutual inductance of one pair of control coils only, and (3) substantially eliminates the mutual inductance of both pairs of control coils. The inclined curve portions connecting the portions $i'$, $i^2$ and connecting the portions $i^2$ and $i^3$, illustrate the relatively abrupt character of the current variations produced as the vane moves in either direction into or out of its intermediate position. As will be apparent the length of the intermediate portion of the curve may be increased or decreased by varying the displacement of the coils B' and b' from the coils B and b. This means of course that the positions of the two sets of control coils should be determined with proper regard to the contemplated range of movement given the vane C.

The armature switches D' and $D^2$ and associated terminals 23, 24, 25, 23', 24' and 25' may be associated with control apparatus of a known type to supply heating current or fuel to a furnace at one rate when both coils D and DA are deenergized and at a second rate when the coil D is energized and coil DA is deenergized, and at a third rate when the coils D and DA are both energized. In many cases the supply of heating current or fuel may be entirely cut off when the vane is in its "high" position. As will be readily understood, the apparatus shown in Fig. 15 may be used to provide three-position control for other purposes than furnace regulation.

With a control system of the type shown in Fig. 15, the two separate relay units may be replaced by a single relay structurally like the relay DE of Figs. 9, 10 and 11 but in which the coils D and DA of Fig. 15 act additively on a common armature $D^5$ associated with control contacts as shown diagrammatically in Fig. 18. In Fig. 18 three spring contact fingers $D^7$, $D^8$ and $D^9$ are arranged side by side but out of contact with one another when the armature $D^5$ is in its idle position shown in Fig. 18. When actuated, the armature $D^5$ turns counter-clockwise and moves its contact $D^6$ into engagement with the contact finger $D^7$. When used in the control system shown in Fig. 15, the armature $D^5$ of Fig. 18 may be actuated by a force which is just sufficient to move contact $D^6$ into engagement with the contact arm $D^7$ when the vane C is in its "low" position and which is sufficient to move the contact arm $D^7$ into engagement with the contact arm $D^8$ when the vane C occupies its "neutral" position and which is sufficient to move the contact $D^8$ into engagement with the contact $D^9$ when the vane C moves into its "high" position. Contact member adjustments which are the reverse of those just described will be produced by movement of the vane C from its "high" position into its "low" position.

The small current normally flowing in the windings when the vane is in its "low" position moves the contact member $D^6$ into engagement with the contact $D^7$ and thereby enables the control apparatus to effect the appropriate low control action. The contact $D^6$ thus serves to prevent unsafe operation as a result of tube failure or other accidental interruption of all current flow through the winding of the relay unit DE. The control circuit conductors associated with the contacts $D^6$, $D^7$, $D^8$ and $D^9$, to effect appropriate low, neutral and high control actions according to the position of the vane C may be arranged in any of various suitable ways as those skilled in the art will understand.

With the cathode 3 of valve $a$ and anode 31 of valve $a'$ connected to the supply conductor 2 and with the anode 6 of valve $a$ and cathode 30 of the valve $a'$ connected to the supply conductor through the condenser 52 as shown in Fig. 15, the effective energizing voltage impressed on the series connected relay coils D and DA is approximately double the line, or supply, voltage between conductors 1 and 2. During periods in which the valve $a$ is not oscillating and the coils D and DA may be effectively energized, the condenser 52 is discharged by the valve $a$ during the half cycles which alternate with half cycles in which the condenser is charged by the valve $a'$. During each half cycle in which the valve $a'$ is conductive and is building up a charge on the condenser 52, the valve $a$ is not conductive and does not interfere with the condenser charging operation. In consequence, the effective voltage impressed on the series connected relay coils D and DA in the following half cycle in which valve $a$ is conductive is the sum of the voltage between the supply conductors 1 and 2 and the approximately equal condenser potential.

When the valve $a$ is oscillating it is not operative to effectively discharge the condenser 52, and after the condenser is fully charged by the diode valve $a'$, the latter ceases to pass any significant amount of current since the potential of the condenser 52 is then approximately as high as the opposing line voltage during the half cycles in which the diode can conduct current. The current flow through the relay coils due to the sixty cycle unidirectional voltage pulses impressed on them is smoothed out by the associated condensers 22 and 33 so that the relays operate substantially as they would if they were energized with continuous unidirectional current. The general combination of a condenser, diode, grid valve and load device shown in Fig. 15, is not claimed herein but is claimed in my copending application Serial No. 541,576 filed of even date herewith, which issued as Patent No. 2,514,918 on July 11, 1950.

Figure 19:
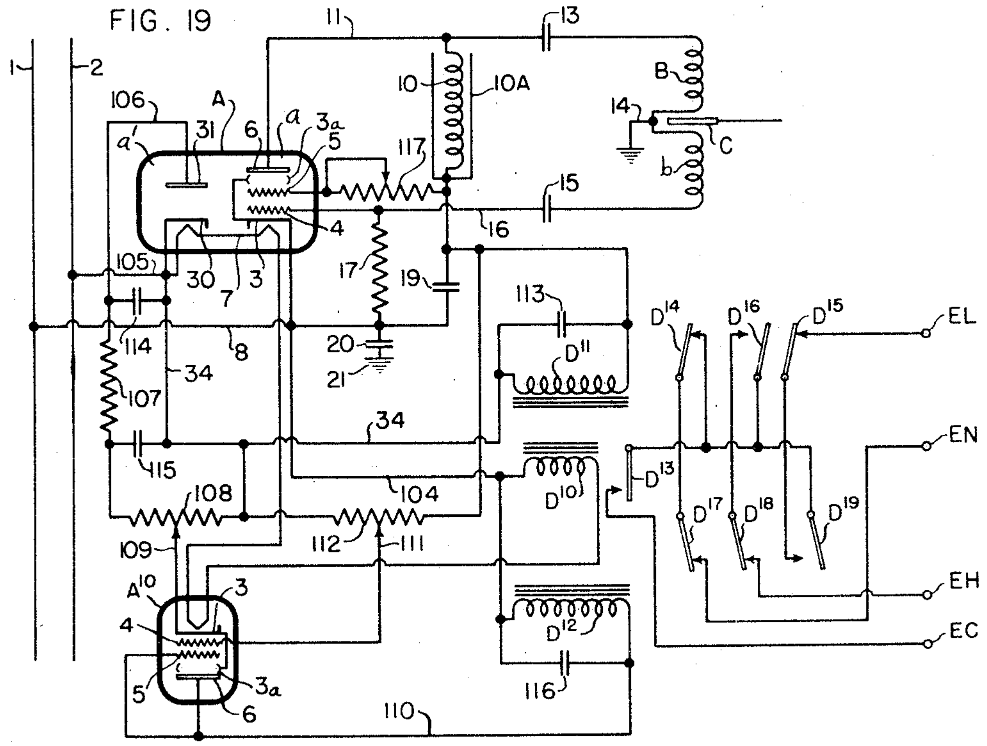

In Fig. 19 I have illustrated an arrangement in which two electronic tubes A and $A^{10}$ and three electromagnetic relays, $D^{10}$, $D^{11}$ and $D^{12}$ are employed to effect three-position control in response to variations in the mutual inductance of a single pair of control coils B and b. The winding of the relay $D^{10}$ is connected in series with the filament elements of the tubes A and $A^{10}$ and a conductor 104 between the branch conductor 8 from the supply conductor 1 and a branch conductor 105 from the supply conductor 2. The latter directly connects the cathode 30 of the diode element in the tube A to the supply conductor 2.

In Fig. 19 the valve $a$ of the tube A and control coils B and b are associated by circuit provisions similar to those shown in Fig. 3. The winding of the relay $D^{11}$ is also connected between the choke coil 10 and the cathode 30 of the diode valve $a'$ in the tube A, as in Fig. 3. In Fig. 19, however, said cathode 30 is directly connected to the supply conductor 2 by the conductor 105 and the plate 31 of the diode is connected by a conductor 106 and a resistance 107 to one termial of a potentiometer resistance 108. The latter has its second terminal connected to the cathode 30 through the conductor 34 which connects that cathode to one terminal of the relay $D^{11}$.

The valve $A^{10}$ may be a beam power amplifier tube of the 35L6-GT form, comprising cathode, control grid, screen grid and plate elements 3, 4, 5 and 6, respectively, similar to those of the valve $a$ included in the tube A. The cathode 3 of the tube $A^{10}$ is connected to the resistance 108 at an adjustable intermediate point through an adjustable contact 109. The plate 6 of the tube $A^{10}$ is connected to the screen grid 5 of the tube and is connected by a conductor 110 to one terminal of the relay $D^{12}$. The second terminal of that relay is connected to the previously mentioned conductor 104. The control grid 4 of the tube $A^{10}$ is connected through a sliding contact 111 to an intermediate point along the length of a potentiometer resistance 112. The latter is connected in parallel with the winding of the relay $D^{11}$ and the by-pass condenser 113 which connects the terminals of that relay.

The terminals of the resistance 107 are connected by blocking condensers 114 and 115 to the conductor 34 and thereby to the supply conductor 2. The condensers 114 and 115 may each have a capacitance of about 8 mfd. The capacitance of the condenser 113 and of the by-pass condenser 116 connecting the terminals of the relay $D^{12}$, may each be about 2 mfd. As shown, the screen grid 5 of the tube A is connected to the choke coil 10 through a variable resistance 117 of the order of one-quarter of a megohm. The resistances 107, 108 and 112 may well be about 1,000 ohms, 200 ohms and 50,000 ohms, respectively. The resistance and capacitance values just stated are given by way of illustration and example and are not critical. It is practically desirable, however, that the resistance 108 should be low as this prevents the tube $A^{10}$ from being appreciably self-biased. By the adjustment of the resistance 117 in circuit it is possible to vary the upper limit of neutral range of variation in value of the controlling quantity which by its variations varies the position of the vane C relative to the coils B and b.

As shown, the energization of the relay $D^{10}$ adjusts a movable contact $D^{13}$ into engagement with a stationary front contact. The energization of the relay $D^{11}$ moves contacts $D^{14}$ and $D^{15}$ out of engagement with stationary back contacts and moves a contact $D^{16}$ into engagement with a corresponding stationary front contact. The energization of the relay $D^{12}$ moves contacts $D^{17}$ and $D^{18}$ out of engagement with associated stationary back contacts and moves contact $D^{19}$ into engagement with a stationary front contact.

In the contemplated operation of the control system shown in Fig. 19 the energization of the filament circuit of the tubes A and $A^{10}$ energizes the relay $D^{10}$ and thereby connects the relay contact $D^{13}$ to an energizing current terminal EC. The latter is then connected through the contact $D^{13}$ and one or more other relay contacts to "high," "neutral" or "low" control conductor terminals EH, EN and EL, respectively, dependent on the position of the vane C relative to the control coils B and b. Thus when the vane C is displaced to the left out of operative relation to the coils B and b as a result of the "low" value of the controlling quantity or condition, the valve a in the tube A oscillates and its current has its minimum value. In consequence, the potential then impressed through the resistance 112 and contact 111 on the control grid 4 of the tube $A^{10}$ is high enough to give the control grid of the tube $A^{10}$ a positive bias. In consequence, the current flow then maintained through the tube $A^{10}$ is large enough to energize the relay $D^{12}$ and the latter operates to connect the conductor EC through the relay contacts $D^{19}$ and $D^{15}$ to the "low" control conductor terminal EL.

As the value of the controlling quantity or condition increases and moves the vane C into position to reduce the mutual inductance of the coils B and b, the oscillation of the valve a in the tube A decreases. The resultant increase in the space current of that valve eliminates the positive bias on the control grid 4 of the tube $A^{10}$ and thereby deenergizes the relay $D^{12}$. On the deenergization of the relay $D^{12}$ the energizing terminal EC is connected through the relay contacts $D^{13}$, $D^{14}$ and $D^{17}$ to the neutral control terminal EN.

On a further increase in the value of the control quantity or condition and the resultant movement of the vane C and reduction in the mutual inductance of the coils B and b, the oscillation of the valve a of the tube A is further reduced and the space current of that valve is further increased to the value required to energize the relay $D^{11}$. The energization of the relay $D^{11}$ operates to connect the energizing terminal EC to the "high" control terminal EH through the relay contacts $D^{13}$, $D^{16}$ and $D^{18}$.

With the arrangement shown in Fig. 19, the value of the controlling quantity or condition at the low value end of its neutral range may be increased or decreased by adjusting the contact 109 to the right or to the left, respectively, along the resistance 108, so as to increase or decrease the value of the plate current of the valve $A^{10}$ maintained at a given value of the plate current of the valve a of the tube A. In general, the adjustment of the contact 109 should be accompanied by a corresponding adjustment in the same direction of the contact 111 along the resistance 112. The use of the potentiometer resistances 108 and 112 connected in bridging relation to the supply conductors minimizes the effect of variations in the supply voltage on the control actions effected. As previously stated, when the adjustable resistance 117 is employed as shown in Fig. 19, it serves by its adjustment to vary the value of the controlling quantity or condition at the upper end of the neutral range of that value.

Fig. 20 illustrates a modification of the three-position control system of Fig. 19. I now deem this modification preferable to the arrangement of Fig. 19 because its use makes possible a substantial reduction in the number of circuit components which are required.

The three position control system of Fig. 20 includes two electronic tubes $A^{10}$ and $A^{100}$, both of which may be of the beam power amplifier type such as the 35L6–GT tube, and two electromagnetic relays D and DA. Relay D is connected in the output circuit of the tube $A^{10}$ and relay DA is connected in the output circuit of tube $A^{100}$. The output circuits of tubes $A^{10}$ and $A^{100}$ are connected in inverse manner to the alternating current supply conductors 1 and 2 so that tube $A^{10}$ is conductive during half cycles alternating with those during which tube $A^{100}$ is conductive. As is explained hereafter, the conductivity of tube $A^{100}$ is controlled in accordance with that of tube $A^{10}$.

In Fig. 20 the tube $A^{10}$ is associated with two control coils B and b in much the same manner that the valve a of Fig. 7 is associated with the said control coils. Hence, oscillation of tube $A^{10}$ is initiated and/or interrupted by movement of the vane C out of or into the position in which it is directly interposed between the coils B and b. The output circuit of tube $A^{10}$ may be traced from the supply conductor 1 to the cathode 3, the anode 6, a choke coil 10 shunted by a resistance 57 and the winding of relay D to the supply conductor 2. When tube $A^{10}$ is oscillating its conductivity is too small to permit sufficient plate current to flow in the said output circuit to energize relay D. When the oscillation is interrupted sufficient plate current to energize relay D flows in the output circuit.

As noted above, the conductivity of the tube $A^{100}$ is controlled in accordance with the conductivity of tube $A^{10}$. This result is produced by impressing on the input circuit of tube $A^{100}$ a voltage produced by the flow of plate current through the winding of relay D. To this end the cathode 3 of tube $A^{100}$ is connected to one end of the winding of relay D and the control electrode 4 is connected to the other end in such a manner that the flow of current through the said winding produces a negative potential on the control electrode 4. This potential is held over to the half cycle during which the tube $A^{100}$ is conductive by the condenser 113. The magnitude of this potential varies in accordance with the plate current flow through the winding of relay D, and therefore, in accordance with the condition of oscillation of tube $A^{10}$. Hence, the conductivity of tube $A^{100}$ is varied in accordance with the latter condition.

The output circuit of tube $A^{100}$ may be traced from the supply conductor 1 through the winding of relay DA shunted by condenser 116 to the plate 6 and the cathode 3 of tube $A^{100}$ to the supply conductor 2.

According to the contemplated operation of the control system of Fig. 20, insufficient plate current flows through tube $A^{10}$ to energize relay D when the vane C is out of the position between coils B and $b$ and tube $A^{10}$ is oscillating. Such small value of plate current as then flows through the winding of relay D is effective to produce only a small negative potential on the control electrode of tube $A^{100}$, and consequently, the latter is then fully conductive and relay DA is energized. Under this condition the armature D' of relay D will be in engagement with its back contact, shown as the lower contact, and the armature of relay DA will be in engagement with its front or upper contact. As the vane C deflects into an intermediate position between the coils B and $b$, the magnitude of oscillation of tube $A^{10}$ decreases and its plate current increases sufficiently to produce a potential drop across the winding of relay D of the required magnitude to effect deenergization of relay DA by decreasing the conductivity of tube $A^{100}$, but not enough to energize relay D. The armatures of both relays will then be in engagement with their lower contacts. Upon further deflection of vane C toward the position directly between the coils B and $b$, the plate current of tube $A^{10}$ increases to a value sufficient to energize relay D. Such additional increase in plate current produces no change in the operative condition of relay DA, and hence, the armature $D^2$ of relay DA will then remain in its lower position while the armature of relay D is adjusted to its upper position.

Figure 21:
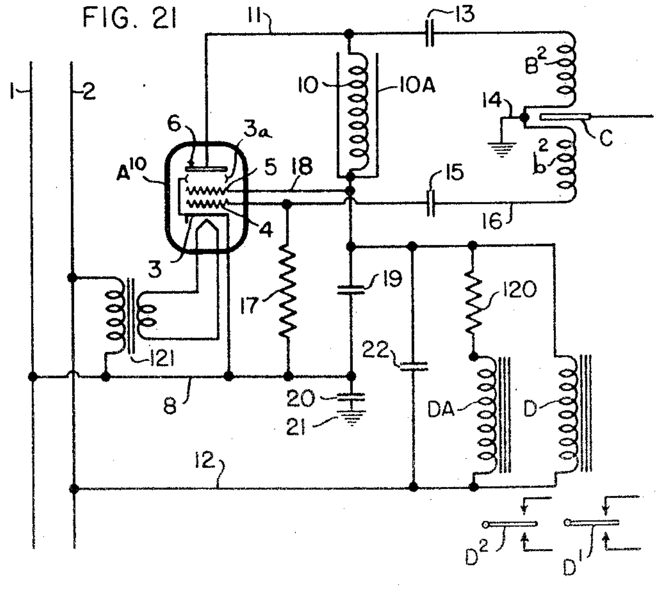

In Fig. 21, I have illustrated a three-position control system including a single electronic tube $A^{10}$ and two electromagnetic relays D and DA connected in parallel in the plate circuit of the tube and selectively responsive to energizing voltages of the different values produced by variations in the position of a controlling vane C relative to control coils $B^2$ and $b^2$. In respect to the association of two control coils and the relay D with an electronic tube, there is no significant difference between the arrangement shown in Fig. 21 and that shown in Fig. 1, for example. The relay DA of Fig. 21 may be identical with the relay D, but is connected to the terminals of the latter through a resistance 120 of such value that the relay DA will not be energized except when subjected to an energizing voltage in suitable predetermined excess of that required for the energization of the relay D. The system shown in Fig. 21 differs superficially, though not in substance, from the system shown in Fig. 1 in consequence of the fact that the tube $A^{10}$ does not include the diode valve element of the tube A, and in that the heating filament of the tube $A^{10}$ is supplied with current from the supply conductors 1 and 2 through a transformer 121.

In the contemplated operation of the control system shown in Fig. 21, oscillation is initiated and/or interrupted by movement of the vane C out of or into the position in which it is directly interposed between the coils $B^2$ and $b^2$. When the tube $A^{10}$ is oscillating its plate current is too small to energize either of the relays D and DA. As the value of the controlling quantity or condition changes and the vane C deflects into a neutral or intermediate position, the magnitude of oscillation of the tube A decreases and its plate current builds up to a value sufficient to energize the relay D, but not to energize the relay DA. On a further deflection of the vane C towards its position shown in Fig. 21, and the extent of which depends upon the magnitude of the resistance 120, the plate current of the tube $A^{10}$ builds up to a value high enough to operatively energize the relay DA.

The manner in which the armature contacts D' and $D_2$ of the respective relays D and DA coact with the related stationary front and back contacts in Figs. 20 and 21 to effect control actions selectively dependent on the deenergization of both relays, on the energization of the relay D only, and on the energization of both relays, will be readily apparent to those skilled in the art and forms no part of the present invention and hence need not be further referred to herein.

Figure 22:
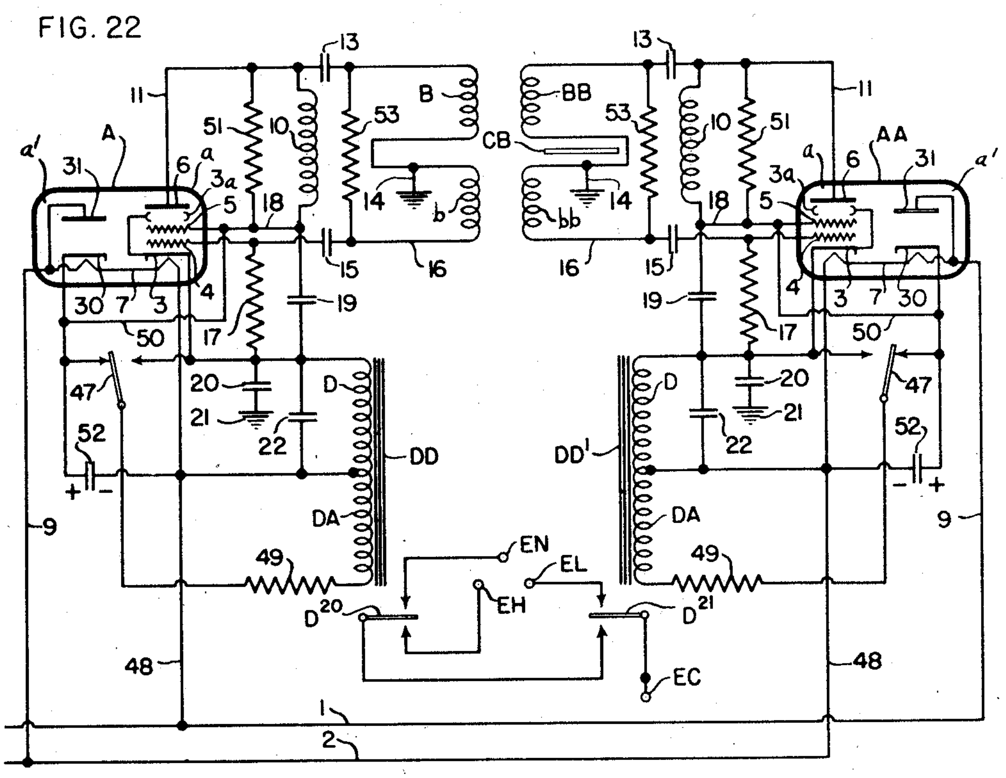
Fig. 22 is a diagram of a three position control system in which two electronic tubes and associated control elements are combined.

In Fig. 22 I have illustrated a three-position control system which I now consider operationably preferable for most purposes to the other three-position control systems illustrated herein. The control system shown in Fig. 22 is broadly characterized by the fact that it combines two electronic valve and circuit arrangement units such as are shown in Figs. 1–8 inclusive, with a single controlling vane element and a single control mechanism unit, in such manner that the oscillation of one valve will be initiated and terminated by movement of the controlling vane element into and out of a position different from that into and out of which it moves to initiate and interrupt the oscillation of the other valve.

In the form illustrated in Fig. 22, the two electronic tubes may be and are shown as identical with the previously described tube A, but to simplify the description, one of the tubes shown in Fig. 22 is designated A, and the other is designated AA. The tube A of Fig. 22 is shown as associated with control coils B and $b$ and with a differential relay DD exactly as is the tube A of Fig. 7. The valve AA is similarly associated with control coils and a differential relay which may be duplicates of those associated with the valve A, but for convenience of description the control coils associated with the tube AA are designated BB, and $bb$ and the differential relay associated with the tube AA is designated DD'. Except as above noted, parts shown in Fig. 22 are designated by the reference symbols which are used in Fig. 7 to designate equivalent parts.

To avoid risk of objectionable reaction whereby either of the circuit units shown in Fig. 22 may give rise to oscillation, or interfere with oscillation, in the other unit, I advantageously arrange the two units as shown so that oscillation in each unit can occur only during the half cycles of power-line voltage which alternate with the half cycles during which oscillation in the other unit can occur. To this end the anode 31 of the tube A of Fig. 22 is connected to the supply conductor 2 and the anode 31 of the tube AA is connected to the supply conductor 1, and the winding center tap of the relay DD is connected to the supply conductor 1 while the winding center tap of the relay DD' is connected to the supply conductor 2.

As shown diagrammatically in Fig. 22, the coils B and *b* are alongside of, but are laterally displaced from, the coils BB and *bb*. The common controlling vane CB is shown in Fig. 22 in which it is laterally displaced from both pairs of control coils and does not significantly impair the mutual inductance of either pair of coils. In its neutral position the vane CB is interposed between, and substantially minimizes the mutual inductance of the coils BB and *bb* but does not significantly impair the mutual inductance of the coils B and *b*. In its high position the vane is interposed between the coils BB and *bb*, as well as between the coils B and *b* and substantially minimizes the mutual inductance of each pair of coils.

Thus in the particular arrangement shown in Fig. 22, both of the relays DD and DD' are deenergized when the vane unit CB is in its "high" position; both relays are energized when the vane CB is in its "low" position; and the relay DD' is deenergized when the vane CB is in its "neutral" position.

With the energization of the relays related to the vane positions as just described, the armature contacts $D^{20}$ and $D^{21}$ actuated by the energization and deenergization of the relays DD and DD' respectively, may be associated with stationary contacts as shown in Fig. 22, so as to operatively connect an energizing contact EC to a "low" control terminal EL, or to a "neutral" control terminal EN, or to a "high" control terminal EH. As will be readily apparent, the effect on the energization and deenergization of the relays DD and DD' of Fig. 22, which is produced by the adjustment of the controlling vane element into its low, neutral and high positions depends on the form and spatial relation of the controlling coils and vane element, and may be varied as conditions make desirable, one such alternate arrangement being shown in Figs. 24 and 25.

Figure 24:
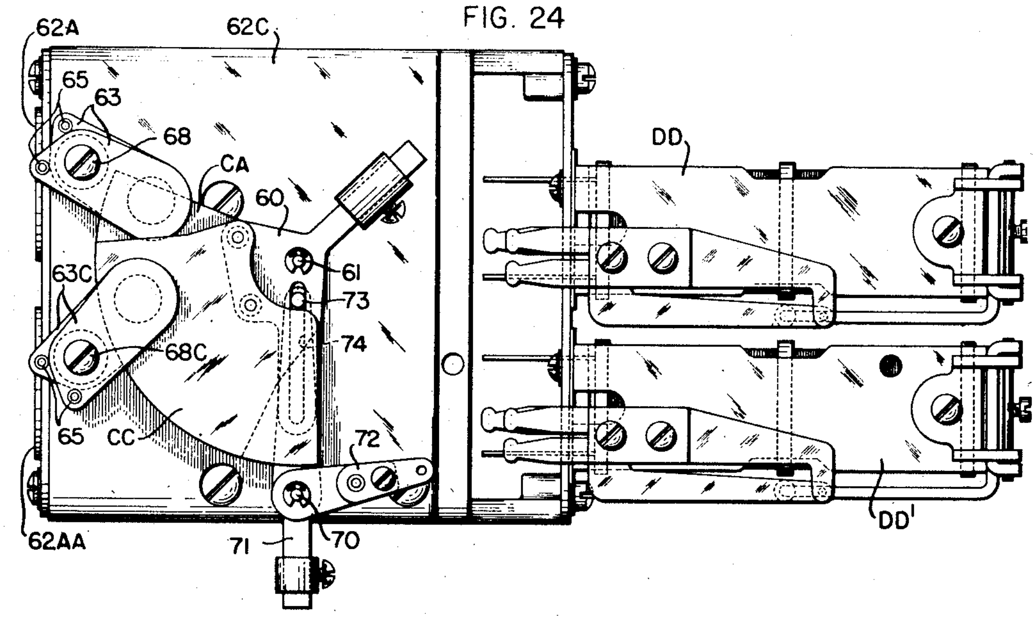
Fig. 24 is an elevation taken similarly to Fig. 10 of a control instrument adapted for use with either of the circuit arrangements shown in Figs. 22 and 23.
Figure 25:
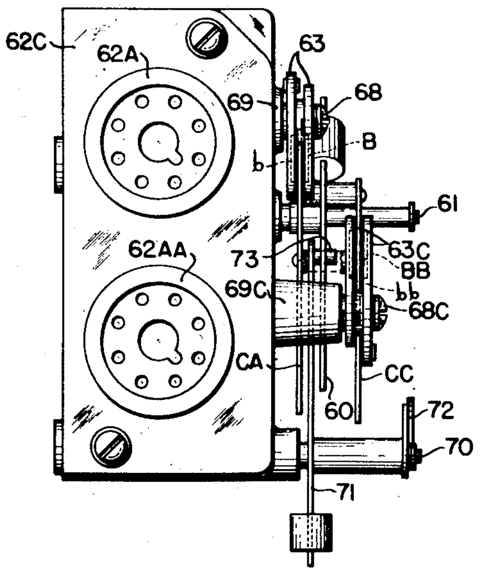
Fig. 25 is a view taken at right angles to Fig. 24.

The controlling vane and coil arrangement illustrated in Figs. 24 and 25, has various practically desirable characteristics. In that arrangement, the controlling vane element comprises two separate, spaced apart, but rigidly connected vane members CA and CC. The vane member CA is formed, mounted and associated with control coils B and *b* exactly as is the vane member CA shown in Figs. 10 and 11. The vane member CC is a flat metallic plate which may be similar in general shape to the member CA, and its plane is parallel to but laterally displaced from the plane of the member CA. The member CC is rigidly mounted on the same vane supporting member 60 on which the vane member CA is mounted. The coils BB and *bb* are carried by supports 63C which may be identical with the supports 63 for the coils B and *b*. As shown, the coil supports 63C are mounted on a short post 69C carried by the instrument casing 62C, and are secured in place by a clamping screw 68C. The mechanism casing 62C is provided at one end with sockets 62A and 62AA for the tubes A and AA, and supports the relay elements DD and DD' at its opposite end.

When the vane element is at the intended limit of its movement in the clockwise direction, the vane CA is interposed between the coils B and *b* and the vane CC is interposed between the coils BB and *bb*. That position of the vane element may be either its "high" position, or its "low" position, depending on the character of the control system in which the vane element is employed.

As will be apparent, an adjustment of 180° of the arm 72 relative to the arm 71, will reverse the direction of the angular adjustment of the vanes CA and CC produced by a given longitudinal adjustment of the link 75. We will assume herein that the vane element and control coils of Figs. 24 and 25 are associated with tubes A and AA and relays DD and DD' as they are in Fig. 22. On that assumption, in the "high" position of the vane element the vane CA is interposed between the coils B and *b* and the vane CC is interposed between the coils BB and *bb* and neither of the associated tubes A and AA is in its oscillating condition. Movement of the vane element counter-clockwise about its pivot 61 from its high position into its "neutral" position leaves the vane CC interposed between the coils BB and *bb*, but moves the vane CA into a position in which it is no longer interposed between the coils B and *b* to the extent required to prevent them from having sufficient mutual inductance to set the tube A into oscillation. In Fig. 24, the vane element is shown in or near the angular position in which the oscillation of the tube A will be initiated by a small turning movement of the vane element in the counter-clockwise direction. To reach its other end, or "low" position and initiate oscillation of the tube AA, the vane element shown in Fig. 24 must turn in the counter-clockwise direction through an angle somewhat greater than thirty degrees from the position in which oscillation of the tube A is initiated. That angle measures the so-called neutral "width," or range of controlling quantity variation between its "high" and "low" values, and may be adjusted by loosening one or both of the screws 68 and 68C and angularly adjusting the coil supports 63 and 63C toward or away from one another. In normal operation, both tubes A and AA continue to oscillate after the vane element turns into its low position, until the vane element turns clockwise from its "low" position far enough to again interrupt oscillation of the tube AA.

Two separate tube and circuit units may be combined in the general manner illustrated in Figs. 22, 24 and 25, to obtain a two-position, or on-off, control which permits of considerable difference between the value of a controlling condition at which a control action is initiated, and the value of the condition at which that controlling action is interrupted. Such an on-off control is desirable, for example, to regulate the intermittent refilling of a water reservoir from which water is withdrawn at an average rate substantially smaller than the rate of refill. One such two-position control system is illustrated in Fig. 23.

Figure 23:
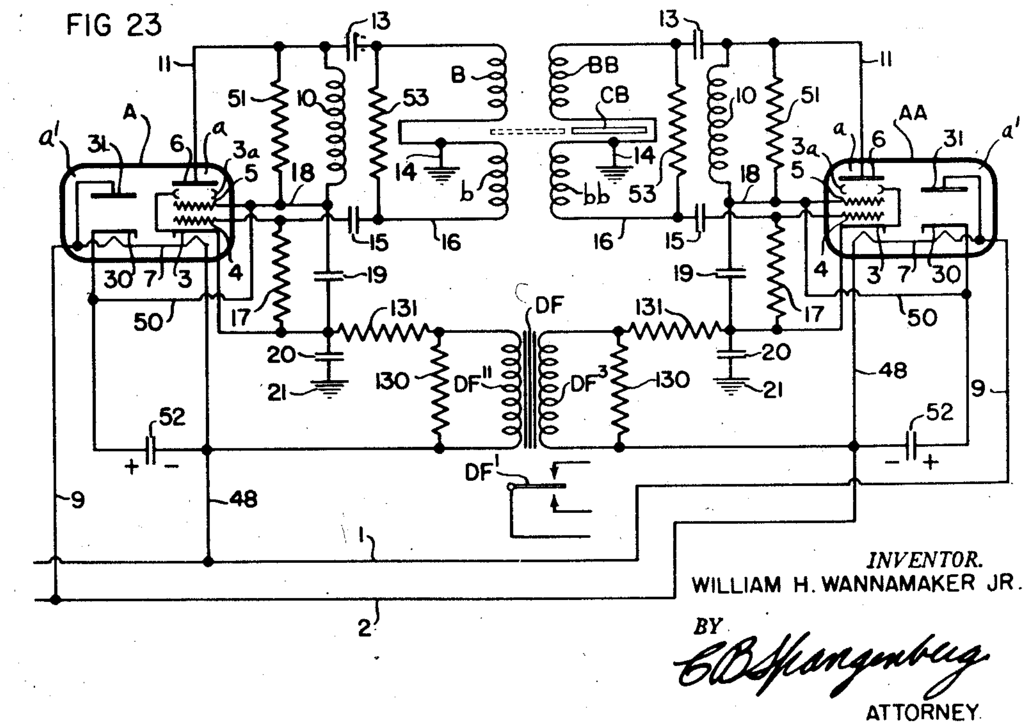
Fig. 23 is a circuit diagram illustrating a modification of the control system shown in Fig. 22.

The arrangement shown in Fig. 23 differs from that shown in Fig. 22 essentially only in the fact that in lieu of the two similar relays DD and DD' employed in Fig. 22, a single relay device DF of different type is employed in Fig. 23. The relay device DF differs operatively from each of relays DD and DD' in that it comprises two energizing coils DF'' and $DF^3$ which act additively, and not differentially, on the associated armature DF'. The latter is biased, as by gravitational force, to a lower position in which it engages a back contact. The relay DF is characterized by the fact that operative energization of both of its coils DF'' and $DF^3$ is needed to move the armature DF' out of engagement with the stationary back contact which it engages when the coils are both deenergized, but each of the coils DF'' and $DF^3$, when operatively energized, is adapted to hold the armature DF' in engagement with its associated front, or upper, stationary contact when the other coil is deenergized after having assisted in effecting such engagement.

The coils DF'' and $DF^3$ are associated with the tubes A and AA of Fig. 23 in the same general manner as the coils D are associated with the tubes A and AA of Fig. 22, but the coils DF'' and $DF^3$ are so wound or connected that their magnetizing actions on the armature DF' are substantially in phase. To facilitate the use of a standard relay structure, each of the coils DF'' and $DF^3$ is shunted by a corresponding resistance 130 and is connected to the corresponding cathode 3 through a resistance 131.

In apparatus of the character shown diagrammatically in Fig. 23, use may well be made of the controlling coil and vane arrangement shown in Figs. 24 and 25, but as shown in Fig. 23 a single vane member CB, as in Fig. 22, is adapted to deflect between the position shown in dotted lines in which the vane member extends between, and substantially eliminates the mutual inductance of both pairs of control coils, and the position shown in full lines in which the vane does not significantly reduce the mutual inductance of either set of coils. While moving through a considerable portion of its arc of movement between its dotted and full line positions, the vane CB prevents the coils BB and *bb* from having significant mutual inductance, but does not significantly minimize the mutual inductance of the coils B and *b*.

In the use of the control system shown in Fig. 23 to regulate the refilling of a water reservoir as mentioned above by way of example, the controlling provisions actuated by the adjustment of the armature DF' may open a water supply valve or start a water pump into operation and thereby initiate the refilling operation when the water in the reservoir falls to a predetermined low and thereby moves the vane CB into its dotted line position shown in Fig. 23. The refilling operation thus initiated will then continue until the water in the reservoir reaches a predetermined high level at which time the vane CB will have reached its full line position, thereby permitting the armature DF' to drop into engagement with its back contact. When this occurs the supply valve is closed or the operation of the supply pump is interrupted.

Figure 26:
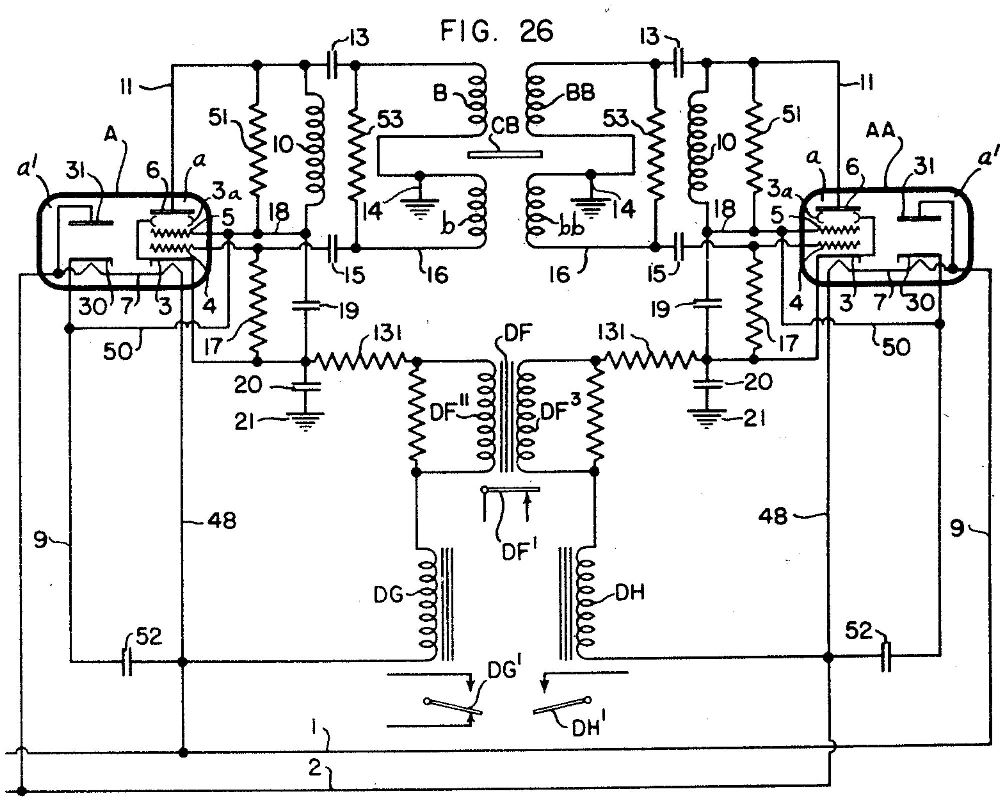
Fig. 26 is a view illustrating another modification of the control system shown in Fig. 22.

A control system comprising two valve and control coil units and a controlling vane element combined with and jointly controlling a relay in the general manner illustrated in Fig. 23, may be combined with other relays to provide a form of anticipatory control, desirable in some cases. One such arrangement is illustrated by way of example in Figs. 26 and 27. The control system shown in Fig. 26 is like that shown in Fig. 23, except that the winding of a relay DG is connected in series with the relay coil DF'' controlled by the tube A, and the winding of a relay DH is connected in series with the winding of the relay $DF^3$ controlled by the valve AA. The armature switch members DG', DF' and DH' of the respective relays DG, DF and DH shown in Fig. 26, are adapted to collectively control the connection of control circuit terminals 140 and 141 in response to controlling condition variations, in a manner illustrated diagrammatically in Fig. 27.

Figure 27:
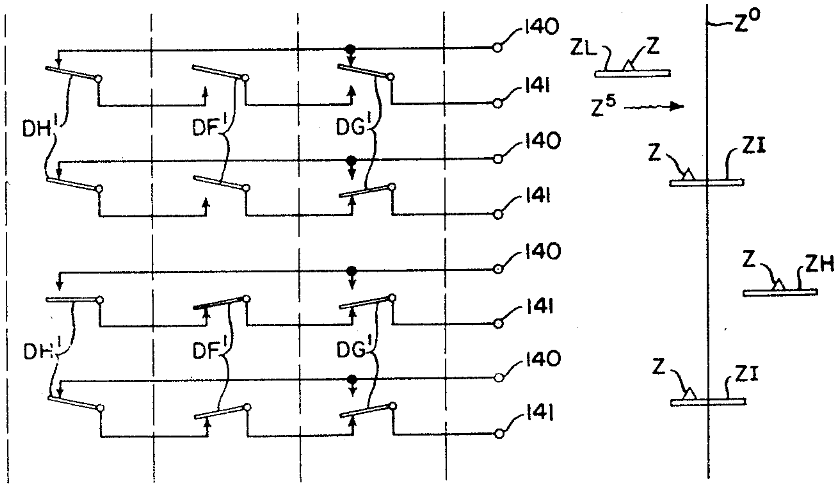
Fig. 27 is a diagram showing the control switches of Fig. 26 in different positions occupied in different conditions of operation.

The left-hand portion of Fig. 27 includes four superposed switch diagrams showing four different sets of adjustments of the switches DF', DG' and DH'. The operating condition under which the switch adjustment shown in each of the superposed diagrams is maintained, is dependent on the immediate and previous value of a controlling quantity, and is indicated in the portion of Fig. 27 at the right of the diagrams. The value of the controlling quantity is indicated in Fig. 27 by the horizontal displacement of an index Z from the vertical line $Z^0$ which indicates an assumed ideal or normal value of the controlling quantity. The displacement of the index Z to the right or left of the line $Z^0$ indicates a corresponding increase or decrease of the value of the controlling condition respectively above or below its ideal normal value.

In the control system illustrated in Fig. 26, the vane element CB and control coils B, *b*, BB and *bb* may be, and are assumed to be, so relatively disposed that the three relays DF, DG and DH are all deenergized when the controlling value Z is in a high zone or range of value variation ZH, and are all energized when the controlling value Z is within a low zone or range of value variation ZL, and the relay DH and the relay winding $DF^3$ are operatively energized whenever the value of the controlling condition is within an intermediate zone or range of value ZI. In consequence of its previously described characteristics, the relay DF will maintain armature DF' in its elevated position when the value Z is within the intermediate zone ZI as a result of an increase in the value Z above a previous low zone ZL value, but will not lift the armature out of its low position when the value Z is within the intermediate zone ZI as the result of a decrease in the value Z from a previous high zone ZH value. As shown the zone ZI is bisected by the line $Z^0$.

As indicated by the portion of Fig. 27 directly to the right of its upper switch diagram, that diagram corresponds to a condition in which the controlling value Z is within the low zone ZL at the left of the intermediate zone ZI. In consequence all of the relays are then energized and each of the armature switches DF', DG' and DH' is raised and the switch DG' connects the terminals 140 and 141.

The second from the top of the series of switch diagrams shown in Fig. 27 illustrates the switch adjustments maintained when the relays DF and DH are energized and the relay DG is deenergized, and in which the switch DF' prevents the connection of the terminals 140 and 141. The operating condition maintaining this switch relation is that in which the controlling condition value Z is within the intermediate zone ZI and has entered that zone from the low zone ZL, as is indicated by the arrow $Z^5$.

In the switch diagram which is the third from the top of the series shown in Fig. 27, the switches DF', DG' and DH' are in their lower positions in consequence of the fact that the control condition value Z is then within the high zone ZH so that the relays DF, DG and DH are all de-energized. With all of the switches in their lower positions the switch DH' prevents the connection of the terminals 140 and 141.

In the lowermost switch diagram shown in Fig. 27, the switches DF' and DG' are in their lower positions and the switch DH' is in its elevated position and completes a connection between the terminals 140 and 141. The switch adjustments shown in the lowermost diagram result from the fact that the controlling condition value Z is within the intermediate zone ZI and has entered that zone as a result of a decrease in the value Z from a previous high zone ZH value.

As will be apparent, the kind of control illustrated diagrammatically in Fig. 27 may be used with advantage in controlling various industrial processes. For example, it is well adapted for use in controlling the heat supply to a continuous fluid heater when a small variation of the temperature of the fluid heated from the ideal normal value is not significantly objectionable. In such case heat may advantageously be supplied to the heater at a relatively high rate whenever the temperature of the fluid heated is within a low temperature zone ZL and at a relatively low rate whenever the temperature of the fluid heated is within a high temperature zone ZH. When the temperature of the fluid heated is within the intermediate temperature zone ZI, however, heat may advantageously be supplied at the relatively low rate or at the relatively high rate accordingly as the temperature of the fluid heated has previously been within the low zone ZL or within the high zone ZH, respectively. As will be apparent, when the temperature of the fluid heated is within the intermediate zone, the supply of heat at a higher rate when the temperature is decreasing than when the temperature is increasing minimizes hunting and tends to prevent wide departures of the temperature from its desired value.

Figure 28:
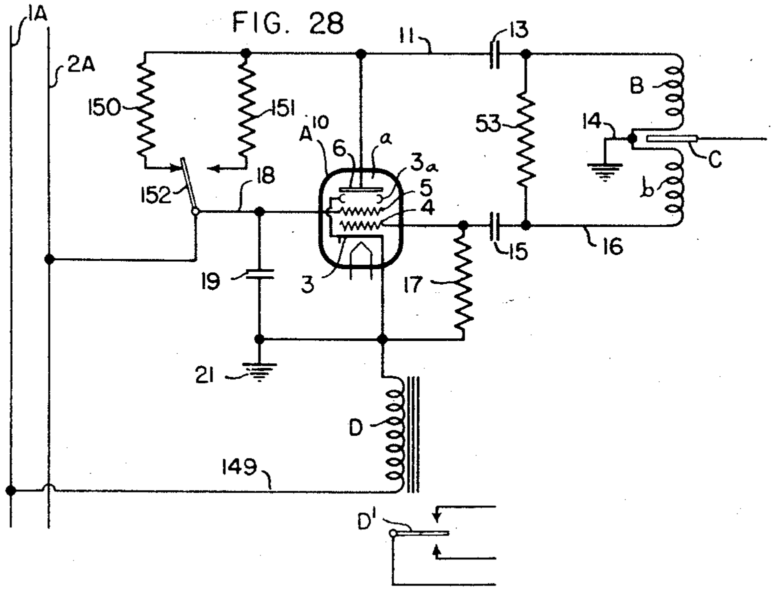
Fig. 28 is a diagram illustrating a control system circuit arrangement adjustable to give the control current different characteristics.

In Fig. 28 I have illustrated an embodiment of my invention including a control circuit in which the choke coil 10 of the circuit previously described is replaced by a non-inductive resistance having different magnitudes for different uses of the control system, as hereinafter explained, and the electronic tube valve *a* employed in Fig. 28 is energized by direct current, shown as supplied by negative and positive supply conductors 1A and 2A respectively. The tube $A^{10}$ shown by way of example in Fig. 28, is a screen grid tetrode which may be exactly like the tube $A^{10}$ shown in Figs. 19, 20 and 21. In Fig. 28 the relay winding D is shown as directly connecting the cathode 3 to a branch 149 of the negative supply conductor 1A. As shown in Fig. 28, the anode 6 may be connected to the positive supply conductor 2A either through a resistance 150 or through a resistance 151, depending on the adjustment of a switch 152. Either one of those resistances may be omitted, however, when the contemplated use of the control system does not require the particular mode of operation which the use of that resistance makes possible.

For their intended purposes, the values of the resistances 150 and 151 are suitably related to the constants of the circuit in which they are employed. On the assumption as to those constants hereinafter stated, the value of the resistance 150 may be 2,000 ohms and the value of the resistance 151 may be 5,000 ohms. With either of said resistances in circuit, the tube $A^{10}$ will be set into oscillation by movement of the vane C out of the position in which it is interposed between the coils B and *b* and prevents those coils from having significant mutual inductance. When the resistance 150 is in circuit, the frequency of tube oscillation will increase and decrease as the vane C is moved to increase and decrease the mutual inductance of the coils B and *b*. With the higher resistance 151 in circuit, the frequency of tube oscillation will increase as the vane C is moved to increase the mutual inductance of the coils until a maximum intensity of oscillation is attained, after which reverse movements of the vane and corresponding changes in the mutual inductance of the coils B and *b* will not interrupt or modify the frequency of tube oscillation.

Figure 29:
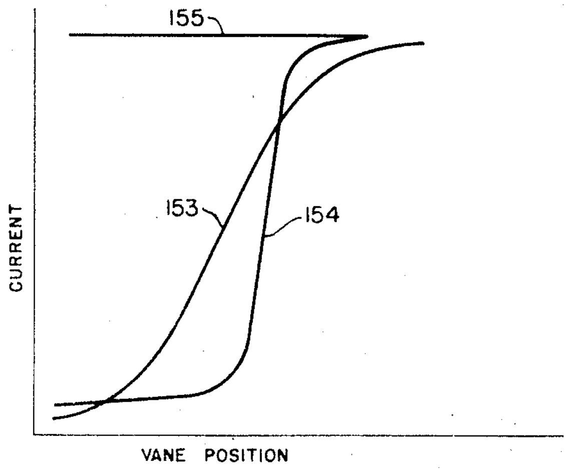
Fig. 29 is a diagram illustrating control current characteristics obtainable with the circuit arrangement of Fig. 28.

With the resistance 150 in circuit the current through the coil D will increase and decrease in the general manner shown by the curve 153 of Fig. 29, as the vane C is moved to decrease and increase the mutual inductance of the coils B and *b*. With the higher resistance 151 in circuit, the current through the coil D will increase to a maximum value in the general manner indicated by the curve 154 of Fig. 29, as the vane C is moved to decrease the mutual inductance of the coils B and *b* as required to permit the oscillation of the tube to attain its minimum value. After the current has once attained said maximum value with the higher resistance 151 in circuit that value is not modified by a reduction in the mutual inductance of the coils B and *b*, and is independent of the position of the vane C, as is indicated by the horizontal extension 155 of the current 154.

The 2,000 ohm and 5,000 ohm values of the resistances 150 and 151 respectively, will insure the operation results stated above when the tube $A^{10}$ is a tetrode of the 117N7G type, and the direct current supply voltage is 115 volts, and the coils B and *b* are formed and arranged generally as illustrated in Figs. 10–14, and hereinbefore described, and the capacitance of the condenser 19 is about 0.005 mfd., and the winding of the relay D comprises about 5,000 turns and its inductance is about 50 henries.

As those skilled in the art will recognize, there are various industrial processes in which advantageous use may be made of a control system in which a control current of the character illustrated by the curve 154 and its extension 155 is established by movement of a controlling element in one direction and is not interrupted by a return movement of the controlling element.

The means disclosed herein for varying the relative angular movements of a controlling vane and of the oscillating member directly engaging and adjusting the vane, as the latter is adjusted through different portions of its range of adjustment, were not invented by me but by Edwin C. Burdick, and are disclosed and claimed in his application, Serial No. 541,510 filed June 22, 1944, which issued as Patent No. 2,481,820 on September 13, 1949.

Certain novel features of the constructions and arrangements disclosed, but not claimed, herein are claimed in one or another of my divisional applications Serial No. 607,034, filed July 25, 1945, now Patent No. 2,511,608 of June 13, 1950; Serial No. 634 559, filed December 12, 1945, now Patent No. 2,511,819 of June 13, 1950; and Serial No. 103,842, filed July 9, 1949.

While in accordance with the provisions of the statues, I have illustrated and described the best forms of my invention now known to me, it will be apparent to those skilled in the art that changes in the form of the embodiments of my invention illustrated and described herein may be made without departing from the spirit of the invention as set forth in the appended claims. It will be understood also that use may sometimes be advantageously made of some features of my invention without a corresponding use of other features.

Having now described my invention, what I claim as new and desire to secure by Letters Patent, is:

1. Control apparatus comprising in combination, an electronic valve including a cathode, anode, control grid and screen grid, an impedance connecting said screen grid and anode, energizing current supply terminals, a pair of control coils each having one terminal connected to one terminal of the other, means connecting said coil terminals to said cathode, a condenser connecting the second terminal of one of said coils to said anode, means connecting the second terminal of the other of said coils to said control grid, means for varying the mutual inductance of said control coils between first and second values at which oscillations are respectively established and interrupted in said control coils, a load device, and a series connection from one to the other of said supply terminals including a connection from one of said supply terminals to said screen grid and through said impedance to said anode, said cathode, and said load device to the other of said supply terminals.

2. Control apparatus comprising in combination, an electronic valve including a cathode, anode, control grid and screen grid, an impedance connecting said screen grid and anode, energizing current supply terminals, a pair of control coils each having one terminal connected to one terminal of the other, means connecting said coil terminals to said cathode, a condenser connecting the second terminal of one of said coils to said anode, means connecting the second terminal of the other of said coils to said control grid, means for varying the mutual inductance of said control coils between first and second values at which oscillations are respectively established and interrupted in said control coils, a load device, a series connection from one to the other of said supply terminals including a connection from one of said supply terminals to said screen grid and through said impedance to said anode, said cathode and said load device to the other of said supply terminals, and a stabilizing resistance connecting the second terminals of said coils.

3. Control apparatus comprising an electronic valve having an input electrode included in an input circuit, an output electrode included in an output circuit, and a common electrode common to both of said circuits, a pair of supply terminals adapted to be directly connected to an alternating current supply line having one side connected to ground, a load device, a load circuit including said output circuit and said load device connected in series between said terminals and operative to pass unidirectional current through said load device and said output circuit and hence to energize said load device, an impedance device having a plurality of connecting terminals one of which is adapted to be connected directly to ground, conductors connecting the terminals of said impedance device in a feedback circuit between said input and output circuits to form an oscillator circuit, a blocking condenser connected in series in each of said conductors, said feedback circuit being operative to feed back electrical energy from said output circuit to said input circuit under the control of said impedance device, adjustable means operable to vary the impedance of said impedance device between a value in which said feedback circuit is operative to cause oscillation of said oscillator circuit and a value in which oscillation of said oscillator circuit is prevented, and a bias impedance included in said input circuit and operative to control the conductivity of said output circuit and hence the energization of said load device in accordance with the oscillation or non-oscillation of said oscillator circuit and hence in accordance with the impedance of said impedance device.

4. Control apparatus as specified in claim 3, wherein said impedance device comprises two control coils arranged in mutually inductive relation to one another and connected in series between first and second of said connecting terminals, the junction between said coils being directly connected to said one of said connecting terminals, wherein one of said conductors connects said first connecting terminal to said output electrode through one of said blocking condensers, wherein a second of said conductors connects said second connecting terminal to said input electrode through a second of said blocking condensers, wherein a third of said conductors connects said one of said connecting terminals to said common electrode through a third of said blocking condensers, and wherein said adjustable means comprises a shielding element adjustable in position between said control coils and operative, when adjusted, to vary the magnitude of the mutual inductance between said control coils and hence the mutual impedance of said impedance device.

5. Control apparatus as specified in claim 2, wherein the second mentioned connecting means includes a condenser, wherein said stabilizing resistance is connected adjacent to said condensers, wherein the connections to said second terminals of said coils are elongated to substantial length between said condensers and said coils, and wherein a stabilizing impedance is connected between said second terminals adjacent to said coils.

6. Control apparatus comprising a first thermionic valve having an input electrode included in an input circuit, an output electrode included in an output circuit, a common electrode common to both of said circuits, and a heating element, a second thermionic valve having an anode, a cathode, and a heating element, a pair of supply terminals adapted to be connected to an alternating current supply line, a load device having a first operating portion, a second operating portion, and control means jointly controlled by said operation portions, a load circuit including said output circuit and said first operating portion connected in series between said terminals and operative to pass unidirectional current through said first operating portion and said output circuit and hence to energize said first operating portion, a circuit operative to energize said second operating portion independently of said output circuit and including said anode, said cathode, and said second operating portion connected in series between said terminals, conductors connecting said heating elements in series between said terminals, an impedance device connected in a feedback circuit between said input and output circuits to form an oscillator circuit, said feedback circuit being operative to feed back electrical energgy from said output circuit to said input circuit under the control of said impedance device, adjustable means operable to vary the impedance of said impedance device between a value in which said feedback circuit is operative to cause oscillation of said oscillator circuit and a value in which oscillaton of said oscillator circuit is prevented, a bias impedance included in said input circuit and operative to vary the energization of said first operating portion in accordance with the oscillation or non-oscillation of said oscillator circuit and hence in accordance with the adjustment of said impedance device, and safety means included in said load device and operative to cause said control means to assume one condition when said oscillator circuit is oscillating, to assume a second condition when said oscillator circuit is not oscillating, and to assume said second condition when neither of said operating portions is effectively energized.

7. Control apparatus comprising a first thermionic valve having an input electrode included in an input circuit, an output electrode included in an output circuit, a common electrode common to both of said circuits, and a heating element, a second thermionic valve having an anode, a cathode, and a heating element, a pair of supply terminals adapted to be connected to an alternating current supply line, a load device having a first operating portion, a second operating portion, and control means jointly controlled by said operating portions, a load circuit including said output circuit and said first operating portion connected in series between said terminals and operative to pass unidirectional current through said first operating portion and said output circuit and hence to energize said first operating portion, a circuit operative to energize said second operating portion independently of said output circuit at a predetermined value and including said anode, said cathode, and said second operating portion connected in series between said terminals, conductors connecting said heating elements in series between said terminals, an impedance device connected in a feedback circuit between said input and output circuits to form an oscillator circuit, said feedback circuit being operative to feed back electrical energy from said output circuit to said input circuit under the control of said impedance device, adjustable means operable to vary the impedance of said impedance device between a value in which said feedback circuit is operative to cause oscillation of said oscillator circuit and a value in which oscillation of said oscillator circuit is prevented, a bias impedance included in said input circuit and operative to vary the energization of said first operating portion in accordance with the oscillation or non-oscillation of said oscillator circuit and hence in accordance with the adjustment of said impedance device to cause said first operating portion to be energized at a value which is below said predetermined value when said oscillator circuit is oscillating and which is substantially equal to said predetermined value when said oscillator circuit is not oscillating, and safety means included in said load device and operative to cause said control means to assume one condition when said oscillator circuit is oscillating and said operating portions are unequally energized, to assume a second condition when said oscillator circuit is not oscillating and said operating portions are substantially equally energized, and to assume said second condition when neither of said operating portions is effectively energized.

8. Control apparatus as specified in claim 7, wherein said load circuit includes said anode and said cathode connected in series with said output circuit and said first operating portion between said terminals.

9. Control apparatus as specified in claim 7, wherein said load circuit includes said anode and said cathode connected in series with said output circuit and said first operating portion between said terminals, wherein said load device comprises a differential electromagnetic relay having a pair of normally open load contacts constituting said control means, having a first operating winding constituting said first operating portion, and having a second operating winding constituting said second operating portion, and wherein said safety means comprises interacting means operative to cause said relay to assume said one condition with said load contacts closed when said windings are unequally energized, to assume said second condition with said load contacts open when said windings are substantially equally energized, and to assume said second condition with said load contacts open when neither of said windings is effectively energized.

10. Control apparatus as specified in claim 7, wherein said first operating portion is energized solely through said output circuit independently of said second valve.

11. Control apparatus as specified in claim 7, wherein said first operating portion is energized solely through said output circuit independently of said second valve, wherein said load device comprises a differential electromagnetic relay having a pair of normally open load contacts constituting said control means, having a first operating winding constituting said first operating portion, and having a second operating winding constituting said second operating portion, and wherein said safety means comprises interacting means operative to cause said relay to assume said one condition with said load contacts closed when said windings are unequally energized, to assume said second condition with said load contacts open when said windings are substantially equally energized, and to assume said second condition with said load contacts open when neither of said windings is effectively energized.

12. Control apparatus comprising a first thermionic valve having an input electrode included in an input circuit, an output electrode included in an output circuit, a common electrode common to both of said circuits, and a heating element, a second thermionic valve having an anode, a cathode, and a heating element, a pair of supply terminals adapted to be connected to an alternating current supply line, a load device having a first operating portion, a second operating portion, and control means jointly controlled by said operating portions, a load circuit including said output circuit, said anode, said cathode, and said first operating portion connected in series between said terminals and operative to pass unidirectional current through said first operating portion and said output circuit and hence to energize said first operating portion, conductors connecting said heating elements in series between said terminals, an impedance device connected in a feedback circuit between said input and output circuits to form an oscillator circuit, said feedback circuit being operative to feed back electrical energy from said output circuit to said input circuit under the control of said impedance device, adjustable means operable to vary the impedance of said impedance device between a value in which said feedback circuit is operative to cause oscillation of said oscillator circuit and a value in which oscillation of said oscillator circuit is prevented, a bias impedance included in said input circuit and operative to vary the energization of said first operating portion in accordance with the oscillation or non-oscillation of said oscillator circuit and hence in accordance with the adjustment of said impedance device, and switch means operative in one position to connect said second operating portion in parallel with only said first operating portion to cause said control means to assume one condition when said oscillator circuit is oscillating, to assume a second condition when said oscillator circuit is not oscillating and to assume said one condition when neither of said operating portions is effectively energized, said switch means being operative in an alternate position to connect said second operating portion in parallel with said series connected output circuit and first operating portion to cause said control means to assume said second condition when said oscillator circuit is oscillating, to assume said one condition when said oscillator circuit is not oscillating, and to assume said one condition when neither of said operating portions is effectively energized.

13. Control apparatus comprising a pair of supply terminals adapted to be connected to an alternating current supply line, two oscillator units each including an electronic valve having an input electrode included in an input circuit, an output electrode included in an output circuit, and a common electrode common to both of said circuits, each of said oscillator units including also a load device and a load circuit including connections connecting said output circuit and said load device in series between said terminals and operative to pass unidirectional current through said load device and said output circuit and hence to energize said load device, said connections being operative to render the potential of the output electrode of the valve of one of said oscillator units positive with respect to the potential of the associated input and common electrodes of that valve during periods in which the potential of the output electrodes of the valve of the other of said oscillator units is rendered negative with respect to the potential of the input and common electrodes of the last mentioned valve, said periods alternating with others in which the foregoing potential relationships are reversed, each of said oscillator units also including an impedance device and conductor means connecting said impedance device in a feedback circuit between said input and output circuits, each of said feedback circuits being operative to feed back electrical energy from the output circuit to the input circuit of the associated one of said valves under the control of the one of said impedance devices associated with that valve, adjustable means responsive to changes in the value of a controlling condition and operative to vary the impedance of one of said impedance devices and to vary in a dissimilar manner the impedance of the other of said impedance devices, the impedance of each of said impedance devices being variable between a value in which the associated one of said feedback circuits is operative to cause oscillation of the associated one of said oscillator units and a value in which oscillation of the associated oscillator unit is prevented, and a bias impedance individual to each of said oscillator units and included in the input circuit of the unit and operative to control the conductivity of the output circuit of the unit and hence the energization of the associated load device of the unit in accordance with the oscillation or non-oscillation of the unit and hence in accordance with the impedance of the impedance device of the unit, whereby the energizations of the load devices of said two oscillator units are varied dissimilarly in response to changes in the value of said controlling condition.

14. Control appartus as specified in claim 13, wherein each of said impedance devices comprises two control coils arranged in mutually inductive relation to one another and connected in series between the input and output electrodes of the valve included in the associated one of said oscillator units, the junction between the coils of each of said impedance devices being connected to the common electrode of the associated one of said valves, and wherein said adjustable means comprises shielding means adjustable in position between the coils of each of said impedance devices and operative, when adjusted, to vary dissimilarly the magnitude of the mutual inductance between the coils of each of said impedance devices and hence to vary dissimilarly the mutual impedance of each of said impedance devices.

15. Control apparatus as specified in claim 13, wherein each of said impedance devices comprises a pair of inductively related control coils separated from one another by a kerf-like space parallel to and laterally displaced from the corresponding space of the other pair of coils, the coils of each of said pairs being connected in series between the input and output electrodes of the valve included in the associated one of said oscillator units, the junction between the coils of each of said pairs being connected to the common electrode of the associated one of said valves, and wherein said adjustable means comprises a movable shielding element having laterally displaced, parallel vane portions each of which is operative to move into and out of a respective one of said spaces as the value of said controlling condition varies.

16. Control apparatus as specified in claim 13, wherein said adjustable means comprises an element operative to deflect into one or another of three positions as the value of said controlling condtion varies through one or another of three sections of its range of variation, wherein there is included regulating means controlled by said load devices, and wherein said regulating means is operative to produce three different control effects accordingly as said element deflects into one or another of said three positions.

17. Control apparatus as specified in claim 13, wherein one side of said alternating current supply line is connected to ground, wherein each of said impedance devices includes a plurality of connecting terminals one of which is adapted to be connected directly to ground, wherein said conductor means includes conductors connecting the terminals of each of said impedance devices in the associated one of said feedback circuits, and wherein there is included a separate blocking condenser connected in series in each of said conductors.

18. Control apparatus as specified in claim 13, wherein one side of said alternating current supply line is connected to ground, wherein each of said impedance devices comprises two control coils, arranged in mutually inductive relation to one another and connected in series between first and second connecting terminals, and includes a third connecting terminal connected to the junction between said coils and adapted to be connected directly to ground, wherein said conductor means includes conductors respectively connecting said first, second, and third connecting terminals of each of said impedance devices to the output electrode, input electrode, and common electrode of the valve included in the associated one of said oscillator units, wherein there is included a separate blocking condenser connected in series in each of said conductors, and wherein said adjustable means comprises shielding means adjustable in position between the coils of each of said impedance devices and operative, when adjusted, to vary dissimilarly the magnitude of the mutual inductance between the coils of each of said impedance devices and hence to vary dissimilarly the mutual impedance of each of said impedance devices.

19. Control apparatus comprising two oscillator units each including a load device and an electronic valve having an input electrode included in an input circuit, an output electrode included in an output circuit, and a common electrode common to both of said circuits, a pair of terminals adapted to be connected to a source of alternating current, first conductors connecting the load device of one of said units in series with the output circuit of that unit between said terminals in opposite potential relation to the manner in which other conductors connect the load device of the other of said units in series with the output circuit of that unit between said terminals, thereby to cause the potential of the output electrode of one of said valves to be rendered positive with respect to the potential of the other electrodes of that valve, and hence to permit the associated unit to oscillate, during operable half cycles for that unit in which the alternating current supplied to said terminals prevents the potential of the output electrode of the other of said valves from being positive with respect to the potential of the other electrodes of that valve and in which the unit associated with the last mentioned valve is therefore rendered positively incapable of oscillating, said half cycles alternating with others in which the foregoing potential relationships are reversed, an oscillatory circuit for each of said units connected between the electrodes of each of said valves and including an oscillatory control portion operative to cause or prevent oscillation of the associated one of said units during the operable half cycles therefor, the oscillation of one of said units being caused or prevented during the operable half cycles therefor independently of whether the oscillation of the other of said units is caused or prevented during the operable half cycles therefor, inductance means included in said oscillatory control portions, and adjustable means associated with said inductance means and operable to vary the inductance of the latter through a plurality of values, for one of which both of said units are caused to oscillate, for a second of which one of said units is caused to oscillate and the other of said units is prevented from oscillating, and for a third of which both of said units are prevented from oscillating.

20. Control apparatus as specified in claim 19, wherein said inductance means includes a separate inductance device included in each of said control portions and operative, when adjusted, to cause or prevent oscillation of the associated oscillator unit and hence to vary the energization of the load device included in said associated unit, and wherein said adjustable means is operative to vary the inductance of said two inductance devices and hence to adjust the latter in a dissimilar manner so as to vary dissimilarly the energization of said load devices.

21. Control apparatus comprising an electronic valve having a control grid included in an input circuit, an anode included in an output circuit, and a cathode common to both of said circuits, a pair of supply terminals adapted to be directly connected to an alternating current supply line having one side connected to ground, a load device, a load circuit including said anode, said cathode, and said load device connected in a series circuit between said terminals and operative to pass the anode current of said valve through said load device to energize the latter, an adjustable, variable impedance device comprising two control coils arranged in mutually inductive relation to one another and connected between first and second connecting terminals, a third connecting terminal connected to the junction between said coils and adapted to be connected directly to ground, conductor means connecting the terminals of said impedance device in a feedback circuit between said input and output circuits to form an oscillator circuit, said conductor means including a first conductor connecting said first connecting terminal to said anode through a first blocking condenser, including a second conductor connecting said second connecting terminal to said control grid through a second blocking condenser, and a third conductor connecting said cathode to one terminal of a third blocking condenser the other terminal of which is adapted to be connected directly to ground, whereby said cathode is connected to said third connecting terminal through said third condenser when said other terminal of the latter and said third connecting terminal are connected to ground, said feedback circuit being operative to feed back electrical energy from said output circuit to said input circuit under the control of the mutual impedance of said impedance device, means operable to vary the mutual impedance of said impedance device between a value in which said feedback circuit is operative to cause oscillation of said oscillator circuit and a value in which oscillation of said oscillator circuit is prevented, the last mentioned means comprising a shielding element adjustable in position between said control coils and operative, when adjusted, to vary the magnitude of the mutual inductance between said coils and hence the mutual impedance of said impedance device, and a bias resistor connected in said input circuit between said control grid and said cathode and operative to control the magnitude of the anode current of said valve and hence the energization of said load device in accordance with the oscillation or non-oscillation of said oscillator circuit and hence in accordance with the adjustment of said last mentioned means.

22. Control apparatus as specified in claim 21, wherein said electronic valve also includes a screen grid, wherein said load circuit includes an inductively reactive element included in said series circuit and having two terminals one of which is directly connected to said anode, wherein said screen grid is directly connected to the other terminal of said inductively reactive element, and wherein there is included a bypass condenser connected directly between said screen grid and said cathode.

WILLIAM H. WANNAMAKER, Jr.

REFERENCES CITED

The following references are of record in the file of this patent:

UNITED STATES PATENTS

| Number | Name | Date |
|---|---|---|
| 880,136 | Gehrung | Feb. 25, 1908 |
| 986,277 | Gale | Mar. 7, 1911 |
| 1,120,708 | Gale | Dec. 15, 1914 |
| 1,508,237 | Murdock | Sept. 9, 1924 |
| 1,571,405 | Goldsmith | Feb. 2, 1926 |
| 1,629,001 | Schelleng | May 17, 1927 |
| 1,653,736 | Shackleton | Dec. 27, 1927 |
| 1,751,485 | Logwood | Mar. 25, 1930 |
| 1,838,084 | Drake | Dec. 29, 1931 |
| 1,944,988 | Lum | Jan. 30, 1934 |

| Number | Name | Date |
|---|---|---|
| 1,973,303 | Appleton | Sept. 11, 1934 |
| 2,076,368 | Fyler | Apr. 6, 1937 |
| 2,153,986 | MacLaren | Apr. 11, 1939 |
| 2,154,260 | Brandenburger | Apr. 11, 1939 |
| 2,154,287 | Schewe | Apr. 11, 1939 |
| 2,169,977 | MacDonald | Aug. 15, 1939 |
| 2,228,163 | Cohen | Jan. 7, 1941 |
| 2,234,184 | MacLaren, Jr. | Mar. 11, 1941 |
| 2,234,895 | Cerveny et al. | Mar. 11, 1941 |
| 2,252,941 | Mittelmann | Aug. 19, 1941 |
| 2,261,153 | Gieringer | Nov. 4, 1941 |
| 2,261,815 | Thompson | Nov. 4, 1941 |
| 2,292,798 | Roberts | Aug. 11, 1942 |
| 2,304,207 | Richardson | Dec. 8, 1942 |
| 2,325,965 | McArthur | Aug. 3, 1943 |
| 2,339,750 | Bartholy | Jan. 25, 1944 |
| 2,343,453 | Gillespie | Mar. 7, 1944 |
| 2,362,021 | Nazar | Nov. 7, 1944 |
| 2,368,785 | Shaw | Feb. 6, 1945 |
| 2,403,744 | Nicholson | July 9, 1946 |
| 2,411,247 | Cohen | Nov. 19, 1946 |
| 2,441,568 | Finnison | May 18, 1948 |
| 2,456,463 | Starie | Dec. 14, 1948 |